(12) United States Patent
Horita et al.

(10) Patent No.: US 12,553,811 B2
(45) Date of Patent: Feb. 17, 2026

(54) ATTENUATED TOTAL REFLECTANCE SPECTROSCOPY APPARATUS, AND ATTENUATED TOTAL REFLECTANCE SPECTROSCOPY METHOD

(71) Applicant: HAMAMATSU PHOTONICS K.K., Hamamatsu (JP)

(72) Inventors: Kazuki Horita, Hamamatsu (JP); Kouichiro Akiyama, Hamamatsu (JP); Yoichi Kawada, Hamamatsu (JP); Hiroshi Satozono, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 142 days.

(21) Appl. No.: 18/283,296

(22) PCT Filed: Jan. 31, 2022

(86) PCT No.: PCT/JP2022/003544
§ 371 (c)(1),
(2) Date: Sep. 21, 2023

(87) PCT Pub. No.: WO2022/201862
PCT Pub. Date: Sep. 29, 2022

(65) Prior Publication Data
US 2024/0175811 A1    May 30, 2024

(30) Foreign Application Priority Data

Mar. 26, 2021  (JP) .................. 2021-052822

(51) Int. Cl.
*G01N 15/04* (2006.01)
*G01N 1/44* (2006.01)
(Continued)

(52) U.S. Cl.
CPC ............. *G01N 15/042* (2013.01); *G01N 1/44* (2013.01); *G01N 21/3577* (2013.01); *G01N 2015/0053* (2013.01); *G01N 2015/045* (2013.01)

(58) Field of Classification Search
CPC .... G01N 1/44; G01N 15/042; G01N 21/3577; G01N 2015/0053; G01N 2015/045
See application file for complete search history.

(56) References Cited

U.S. PATENT DOCUMENTS

| | | | | | |
|---|---|---|---|---|---|
| 3,478,206 | A | * | 11/1969 | Gaglione | G01N 21/552 356/38 |
| 3,620,675 | A | * | 11/1971 | Olson | G01N 13/00 422/68.1 |

(Continued)

FOREIGN PATENT DOCUMENTS

| | | |
|---|---|---|
| CN | 101138712 A | 3/2008 |
| CN | 106841057 A | 6/2017 |

(Continued)

OTHER PUBLICATIONS

International Preliminary Report on Patentability mailed Oct. 5, 2023 for PCT/JP2022/003544.

(Continued)

*Primary Examiner* — Blake C Riddick
(74) *Attorney, Agent, or Firm* — Faegre Drinker Biddle & Reath LLP

(57) ABSTRACT

An ATR apparatus includes a prism having a reflection surface, a holding unit holding a sample including a suspension on the reflection surface, and an adjustment unit adjusting a fluidal state of the sample held on the reflection surface. The adjustment unit adjusts the fluidal state of the sample to a first fluidal state in order to acquire a first detection result relating to the sample in the first fluidal state and adjusts the fluidal state of the sample to a second fluidal (Continued)

state in order to acquire a second detection result relating to the sample in the second fluidal state.

14 Claims, 13 Drawing Sheets

(51) Int. Cl.
*G01N 15/00* (2024.01)
*G01N 21/3577* (2014.01)

(56) References Cited

U.S. PATENT DOCUMENTS

| | | | | |
|---|---|---|---|---|
| 4,227,083 A * | 10/1980 | Sherinski | G01N 33/445 | 250/341.1 |
| 5,051,551 A * | 9/1991 | Doyle | G01N 21/552 | 250/341.8 |
| 5,097,129 A * | 3/1992 | de Vries | G01N 21/552 | 250/341.8 |
| 5,229,611 A * | 7/1993 | Ukon | G02B 19/009 | 250/353 |
| 5,338,935 A * | 8/1994 | Truett | G01J 3/453 | 250/339.08 |
| 5,436,454 A * | 7/1995 | Bornstein | G01N 21/552 | 250/341.8 |
| 5,694,930 A * | 12/1997 | Pries | G01D 3/036 | 356/136 |
| 6,683,216 B1 * | 1/2004 | Zoeller | C07C 209/58 | 564/414 |
| 7,255,835 B2 * | 8/2007 | Franzen | G01N 21/552 | 436/95 |
| 7,956,328 B2 | 6/2011 | Sundaram et al. | | |
| 8,629,399 B2 | 1/2014 | Thomson et al. | | |
| 2002/0155541 A1 | 10/2002 | Naughton et al. | | |
| 2004/0147034 A1 * | 7/2004 | Gore | A61B 5/1459 | 436/171 |
| 2006/0231762 A1 * | 10/2006 | Ohtake | G01N 21/552 | 250/341.8 |
| 2007/0272004 A1 * | 11/2007 | Rode | A01C 23/007 | 222/61 |
| 2010/0089117 A1 * | 4/2010 | Liu | G01J 3/4338 | 73/1.06 |
| 2011/0001965 A1 * | 1/2011 | Messerschmidt | G01N 21/552 | 356/317 |
| 2011/0024630 A1 | 2/2011 | Sundaram et al. | | |
| 2011/0070602 A1 * | 3/2011 | Thomson | G01N 21/552 | 435/29 |
| 2011/0188043 A1 | 8/2011 | Davidov et al. | | |
| 2012/0026483 A1 * | 2/2012 | Messerchmidt | G01J 3/457 | 356/72 |
| 2012/0228519 A1 | 9/2012 | Gilmore et al. | | |
| 2013/0019671 A1 * | 1/2013 | Stibbe | E21B 49/08 | 73/152.24 |
| 2013/0187050 A1 * | 7/2013 | Takebe | G01N 21/3563 | 250/339.11 |
| 2013/0256534 A1 * | 10/2013 | Micheels | G01N 21/8507 | 250/339.07 |
| 2015/0129766 A1 * | 5/2015 | Gbaguidi | G01N 21/3577 | 250/340 |
| 2015/0233839 A1 * | 8/2015 | Song | G01J 3/0254 | 356/30 |
| 2015/0241340 A1 | 8/2015 | Kubota et al. | | |
| 2015/0241348 A1 * | 8/2015 | Ouchi | G01N 21/3586 | 250/353 |
| 2015/0309019 A1 * | 10/2015 | Kaneko | G01N 33/5306 | 436/501 |
| 2016/0139047 A1 * | 5/2016 | Geiger | G01N 21/3577 | 250/339.11 |
| 2016/0143539 A1 * | 5/2016 | Koerner | A61B 5/0086 | 600/475 |
| 2016/0146722 A1 * | 5/2016 | Koerner | G01N 21/65 | 356/497 |
| 2016/0369214 A1 * | 12/2016 | Mosher | C12C 11/003 | |
| 2017/0029761 A1 * | 2/2017 | Hoffmann-Petersen | G01N 21/272 | |
| 2017/0082539 A1 * | 3/2017 | Respini | G01N 33/28 | |
| 2017/0371139 A1 * | 12/2017 | Ueda | G01N 21/552 | |
| 2018/0003619 A1 * | 1/2018 | Sieben | G01N 33/2835 | |
| 2018/0113025 A1 * | 4/2018 | Morales Rodriguez | G01N 21/25 | |
| 2018/0321152 A1 * | 11/2018 | Nagai | G01N 21/6428 | |
| 2019/0120757 A1 * | 4/2019 | Watanabe | G01N 21/3577 | |
| 2020/0393370 A1 * | 12/2020 | Do | G01N 21/35 | |
| 2022/0011227 A1 * | 1/2022 | Shah | G01N 33/4833 | |

FOREIGN PATENT DOCUMENTS

| | | |
|---|---|---|
| CN | 111504941 A | 8/2020 |
| CN | 111504941 B | 1/2021 |
| EP | 1930714 A2 | 6/2008 |
| EP | 2594920 B1 | 6/2016 |
| JP | 2000-221136 A | 8/2000 |
| JP | 2002-533305 A | 10/2002 |
| JP | 2003-156429 A | 5/2003 |
| JP | 2009-535202 A | 10/2009 |
| JP | 2012-177691 A | 9/2012 |
| JP | 2012-202951 A | 10/2012 |
| JP | 2012-231779 A | 11/2012 |
| JP | 2013-505462 A | 2/2013 |
| JP | 2013-152159 A | 8/2013 |
| JP | 5848621 B2 | 1/2016 |
| JP | 2018-062635 A | 4/2018 |
| JP | 2018-146307 A | 9/2018 |
| WO | WO-00/037405 A1 | 6/2000 |
| WO | WO-2007/127974 A2 | 11/2007 |
| WO | WO-2011/037727 A1 | 3/2011 |
| WO | 2011/151743 A1 | 12/2011 |
| WO | 2013/027034 A1 | 2/2013 |

OTHER PUBLICATIONS

International Preliminary Report on Patentability mailed Oct. 5, 2023 for PCT/JP2022/014044.
Office Action issued Apr. 21, 2025 in related U.S. Appl. No. 18/280,497.
Notice of Allowance dated Aug. 29, 2025 that issued in U.S. Appl. No. 18/280,497.

* cited by examiner

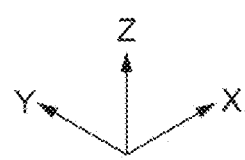
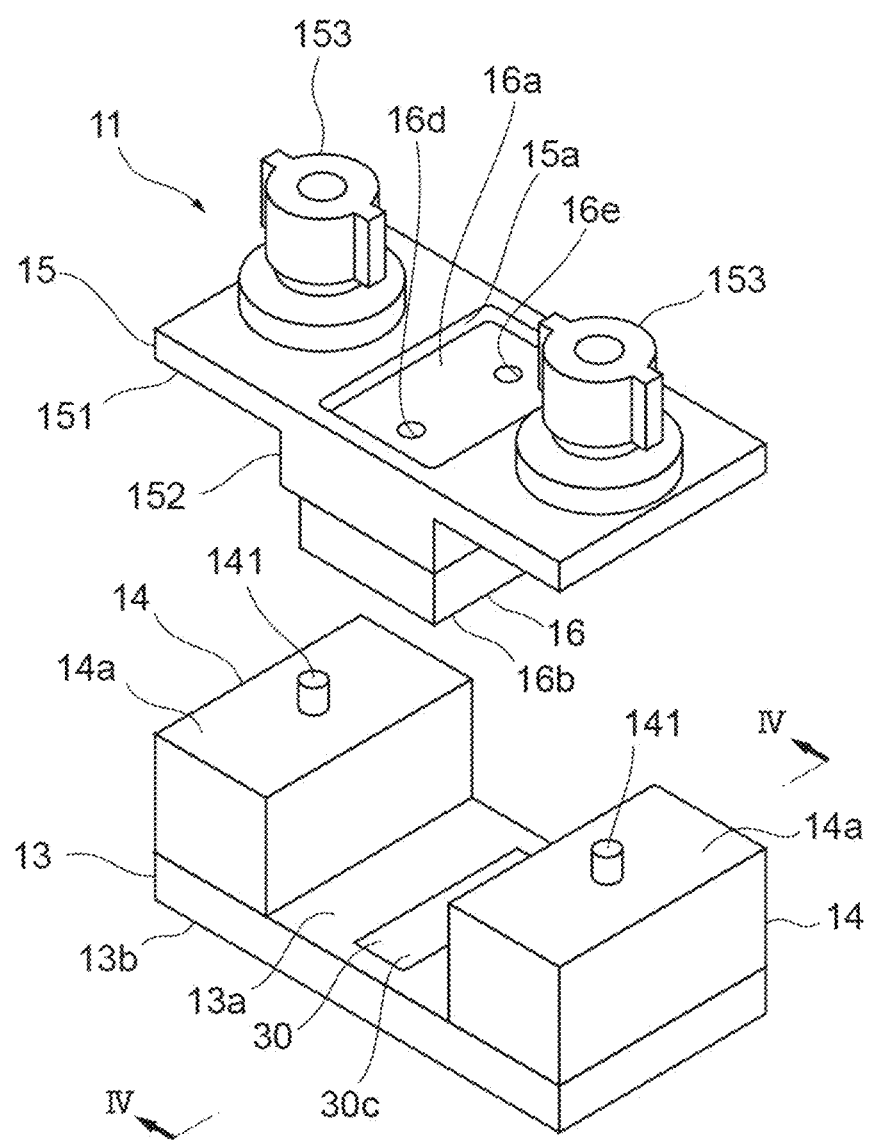

Fig.6
(a)
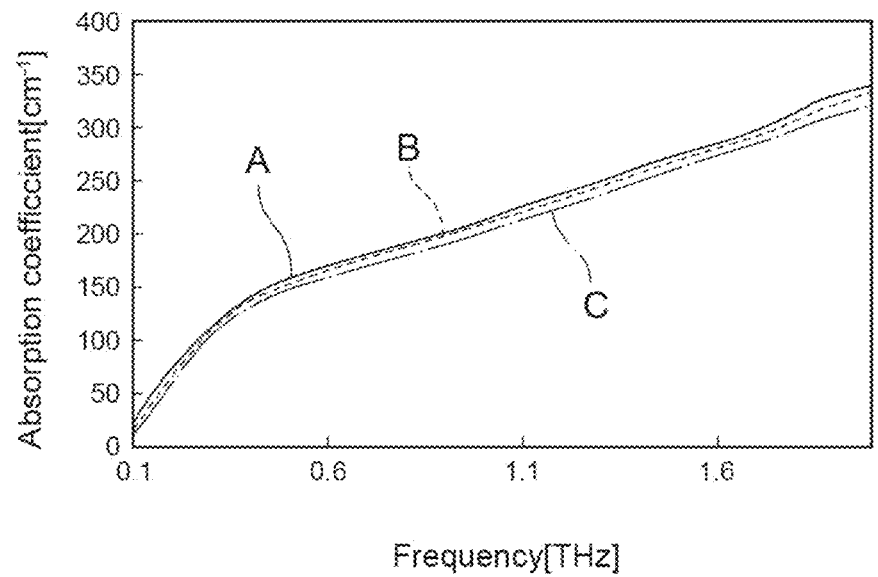
(b)
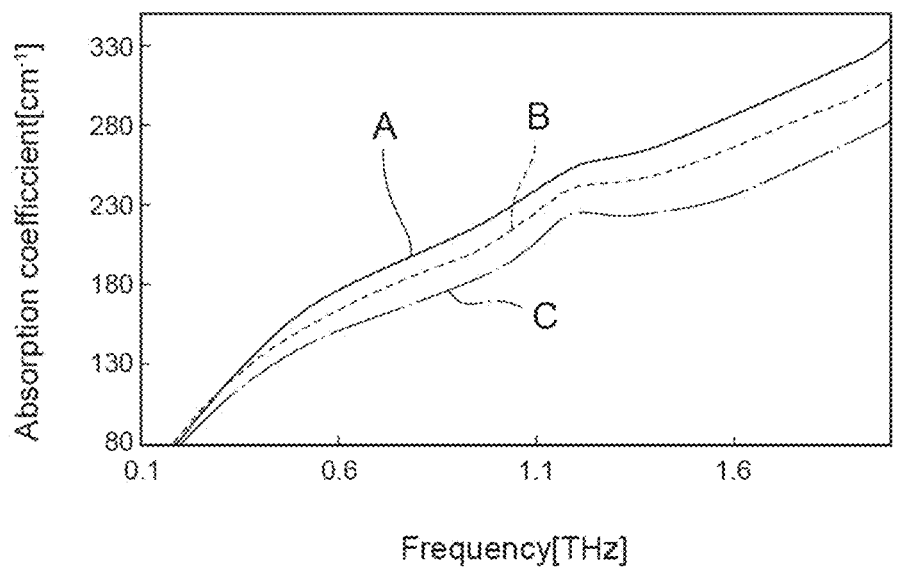

ATTENUATED TOTAL REFLECTANCE SPECTROSCOPY APPARATUS, AND ATTENUATED TOTAL REFLECTANCE SPECTROSCOPY METHOD

TECHNICAL FIELD

The present disclosure relates to an attenuated total reflectance spectroscopy apparatus and an attenuated total reflectance spectroscopy method.

BACKGROUND ART

Patent Literature 1 discloses a drug evaluation apparatus as an attenuated total reflectance spectroscopy apparatus, performing evaluation of a drug suspended in an evaluation liquid. In the attenuated total reflectance spectroscopy apparatus disclosed in Patent Literature 1, the presence or absence of crystalline particles suspended in an evaluation liquid, the presence or absence of non-crystalline particles suspended in the evaluation liquid, a proportion of crystalline particles suspended in the evaluation liquid or the like is distinguished, as information relating to a sample.

CITATION LIST

Patent Literature

[Patent Literature 1] Japanese Patent No. 5848621

SUMMARY OF INVENTION

Technical Problem

In attenuated total reflectance spectroscopy apparatuses as described above, regarding a sample, it may be required to acquire not only the information described above but also acquire more detailed information. However, if it is intended to acquire detailed information relating to a sample, for example, it is assumed that information relating to samples prepared separately will be acquired individually. In this case, there is concern that work may become complicated.

Hence, an object of the present disclosure is to provide an attenuated total reflectance spectroscopy apparatus and an attenuated total reflectance spectroscopy method capable of easily acquiring detailed information relating to a sample.

Solution to Problem

An attenuated total reflectance spectroscopy apparatus according to an aspect of the present disclosure includes an optical element having a reflection surface, a holding unit holding a sample including a suspension on the reflection surface, and an adjustment unit adjusting a fluidal state of the sample held on the reflection surface. The adjustment unit adjusts the fluidal state of the sample to a first fluidal state in order to acquire a first detection result relating to the sample in the first fluidal state, and adjusts the fluidal state of the sample to a second fluidal state in order to acquire a second detection result relating to the sample in the second fluidal state.

In this attenuated total reflectance spectroscopy apparatus, a sample including a suspension is held on the reflection surface of the optical element. The adjustment unit adjusts the fluidal state of the sample to the first fluidal state in order to acquire the first detection result relating to the sample in the first fluidal state, and adjusts the fluidal state of the sample to the second fluidal state in order to acquire the second detection result relating to the sample in the second fluidal state. Accordingly, for example, an amount of suspended substance in the sample at a position closer to the reflection surface can be relatively decreased by making the first fluidal state relatively strong, and a detection result relating to the sample having a relatively small suspended substance content can be acquired as the first detection result. In addition, for example, the amount of suspended substance in the sample at a position closer to the reflection surface can be relatively increased by making the second fluidal state relatively weak, and a detection result relating to the sample having a relatively large suspended substance content can be acquired as the second detection result. Accordingly, for example, without separately preparing samples, both the detection result for close to a liquid in the sample and the detection result for close to a suspended substance in the sample can be acquired. Thus, according to this attenuated total reflectance spectroscopy apparatus, detailed information relating to the sample can be easily acquired.

In the attenuated total reflectance spectroscopy apparatus according to the aspect of the present disclosure, the holding unit may include a holder disposed on the reflection surface. The holder may have a recessed portion defining an accommodation space for the sample together with the reflection surface, an introduction hole communicating with the recessed portion and allowing the sample to be introduced into the accommodation space to flow therethrough, and an outlet hole communicating with the recessed portion and allowing the sample to be lead out from the accommodation space to flow therethrough. The adjustment unit may include a pump causing the sample to circulate from the outlet hole to the introduction hole, and an output control unit controlling an output of the pump. Accordingly, the sample held on the reflection surface can be caused to flow using the pump. In addition, a flow velocity of the sample held on the reflection surface can be controlled and the fluidal state of the sample can be adjusted by controlling an output of the pump.

In the attenuated total reflectance spectroscopy apparatus according to the aspect of the present disclosure, the holder may have transparency with respect to visible light. Accordingly, the fluidal state of the sample held on the reflection surface can be visually observed.

The attenuated total reflectance spectroscopy apparatus according to the aspect of the present disclosure may further include a light output unit outputting light to the reflection surface from a side opposite to the sample, and a light detection unit detecting the light reflected on the reflection surface. The adjustment unit may adjust the fluidal state of the sample during a period in which the light detection unit detects the light. Accordingly, during a period of detection of light, the first detection result and the second detection result relating to the sample can be easily acquired.

In the attenuated total reflectance spectroscopy apparatus according to the aspect of the present disclosure, the light output from the light output unit may be terahertz waves. Accordingly, the first detection result and the second detection result relating to the sample can be accurately acquired using terahertz waves.

The attenuated total reflectance spectroscopy apparatus according to the aspect of the present disclosure may further include an introduction tube supplying the sample to the holding unit, and a temperature adjustment unit adjusting a temperature of the sample flowing through the introduction tube. The introduction tube may be connected to the holding unit. The temperature adjustment unit may be provided to the introduction tube. Accordingly, the temperature of the sample held by the holding unit can be maintained to be constant, for example, by adjusting the temperature of the sample flowing through the introduction tube. Therefore, detailed information relating to the sample can be acquired with high accuracy.

In the attenuated total reflectance spectroscopy apparatus according to the aspect of the present disclosure, the temperature adjustment unit may include a heat treatment portion performing heat treatment or cooling treatment with respect to the sample flowing through the introduction tube, a detection portion detecting a temperature of the sample flowing through the introduction tube, and a control unit controlling an output of the heat treatment portion. The heat treatment portion may be provided outside the introduction tube. The control unit may increase and decrease the output of the heat treatment portion on the basis of a detection result of the detection portion. Accordingly, the temperature of the sample flowing through the introduction tube can be adjusted with high accuracy. For this reason, the temperature of the sample held by the holding unit can be maintained with high accuracy, and detailed information relating to the sample can be acquired with higher accuracy.

In the attenuated total reflectance spectroscopy apparatus according to the aspect of the present disclosure, the heat treatment portion may include a Peltier element. Accordingly, adjustment of the temperature of the sample flowing through the introduction tube can be easily and reliably realized with high accuracy.

An attenuated total reflectance spectroscopy method according to another aspect of the present disclosure includes a first step of holding a sample including a suspension on a reflection surface, a second step of adjusting a fluidal state of the sample such that the sample held on the reflection surface is in a first fluidal state, a third step of acquiring a first detection result relating to the sample in the first fluidal state, a fourth step of adjusting the fluidal state of the sample such that the sample held on the reflection surface is in a second fluidal state, and a fifth step of acquiring a second detection result relating to the sample in the second fluidal state.

In this attenuated total reflectance spectroscopy method, in the third step, the first detection result relating to the sample in the first fluidal state is acquired, and in the fifth step, the second detection result relating to the sample in the second fluidal state is acquired. Accordingly, for example, in the second step, an amount of suspended substance in the sample at a position closer to the reflection surface can be relatively decreased by making the first fluidal state relatively strong, and in the third step, a detection result relating to the sample having a relatively small suspended substance content can be acquired as the first detection result. In addition, for example, in the fourth step, the amount of suspended substance in the sample at a position closer to the reflection surface can be relatively increased by making the second fluidal state relatively weak, and in the fifth step, a detection result relating to the sample having a relatively large suspended substance content can be acquired as the second detection result. Accordingly, for example, without separately preparing samples, both the detection result for close to a liquid in the sample and the detection result for close to a suspended substance in the sample can be acquired. Thus, according to this attenuated total reflectance spectroscopy method, detailed information relating to the sample can be easily acquired.

In the attenuated total reflectance spectroscopy method according to the aspect of the present disclosure, the first fluidal state may be stronger than the second fluidal state. Accordingly, the first detection result and the second detection result relating to the sample can be reliably acquired.

In the attenuated total reflectance spectroscopy method according to the aspect of the present disclosure, the second fluidal state may be a stationary state. Accordingly, in the fourth step, the suspended substance in the sample held on the reflection surface can be precipitated, and in the fifth step, a detection result relating to a precipitate constituted of the suspended substance can be acquired as the second detection result.

The attenuated total reflectance spectroscopy method according to the aspect of the present disclosure may further include a sixth step. In the sixth step, light is output to the reflection surface from a side opposite to the sample, and the light reflected on the reflection surface is detected. The second step, the third step, the fourth step, and the fifth step may be performed during a period in which the sixth step is performed. Accordingly, during a period of detection of light, the first detection result and the second detection result relating to the sample can be easily acquired.

In the attenuated total reflectance spectroscopy method according to the aspect of the present disclosure, the light may be terahertz waves. Accordingly, the first detection result and the second detection result relating to the sample can be accurately acquired using terahertz waves.

The attenuated total reflectance spectroscopy method according to the aspect of the present disclosure may further include a seventh step of acquiring information relating to the sample on the basis of the first detection result and the second detection result. Accordingly, as described above, detailed information relating to the sample can be easily acquired.

Advantageous Effects of Invention

According to the present disclosure, it is possible to provide an attenuated total reflectance spectroscopy apparatus and an attenuated total reflectance spectroscopy method capable of easily acquiring detailed information relating to a sample.

BRIEF DESCRIPTION OF DRAWINGS

FIG. 3 is an exploded perspective view of a holding unit illustrated in FIG. 2.

FIG. 6 is a view illustrating results of the attenuated total reflectance spectroscopy method of a first example.

DESCRIPTION OF EMBODIMENTS

Hereinafter, embodiments of the present disclosure will be described in detail with reference to the drawings. In each diagram, the same reference signs are applied to parts which are the same or corresponding, and duplicate description thereof will be omitted.

Figure 1:
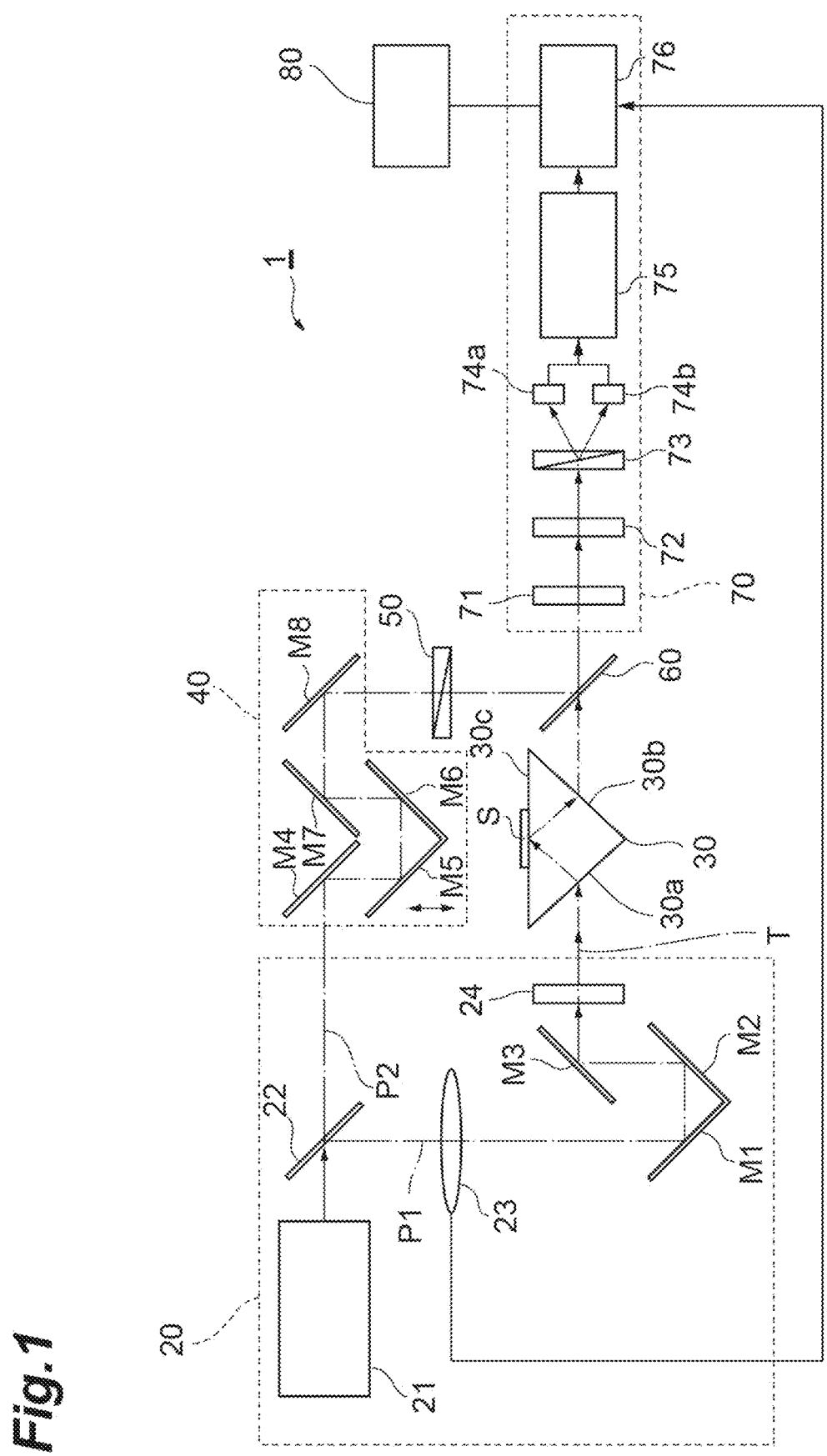
FIG. 1 is a view of a constitution of an attenuated total reflectance spectroscopy apparatus of a first embodiment.

[First embodiment][ATR apparatus] As illustrated in FIG. 1, an attenuated total reflectance spectroscopy apparatus 1 of a first embodiment includes a light output unit 20, a prism (optical element) 30, an optical length difference adjustment section 40, a polarizer 50, a multiplexing portion 60, a light detection unit 70, and a processing unit 80. The attenuated total reflectance spectroscopy apparatus 1 is an apparatus for acquiring information relating to a sample S, for example, by performing an attenuated total reflectance spectroscopy (ATR) method using terahertz waves. Hereinafter, "the attenuated total reflectance spectroscopy apparatus 1" will be referred to as "the ATR apparatus 1". For example, the ATR apparatus 1 is used as a quality analysis tool in steps of manufacturing pharmaceuticals, food, chemical materials, and the like or an analysis tool in research and development stages for pharmaceuticals, food, chemical materials, and the like.

The light output unit 20 outputs terahertz waves T as light. Specifically, the light output unit 20 has a light source 21, a branch portion 22, a chopper 23, a plurality of mirrors M1 to M3, and a terahertz wave generation element 24. The light source 21 outputs light by pulse oscillation. For example, the light source 21 is a femtosecond pulsed laser light source outputting pulsed laser light having a pulse width of approximately femtoseconds. For example, the branch portion 22 is a beam splitter or the like. The branch portion 22 causes light output from the light source 21 to branch into pump light P1 and probe light P2. The chopper 23 alternately repeats passing and blocking of the pump light P1 output from the branch portion 22 in a regular cycle.

Each of the mirrors M1 to M3 sequentially reflects the pump light P1 which has passed through the chopper 23. The pump light P1 which has passed through the chopper 23 is sequentially reflected by each of the mirrors M1 to M3 and is then incident on the terahertz wave generation element 24. Hereinafter, an optical system of the pump light P1 from the branch portion 22 to the terahertz wave generation element 24 will be referred to as "a pump optical system".

The terahertz wave generation element 24 outputs the terahertz waves T when the pump light P1 reflected by the mirror M3 is incident thereon. For example, the terahertz wave generation element 24 includes a nonlinear optical crystal (for example, ZnTe), a photoconductive antenna element (for example, an optical switch using GaAs), a semiconductor (for example, InAs) or a superconductor. When the terahertz wave generation element 24 includes a nonlinear optical crystal, the terahertz wave generation element 24 generates the terahertz waves T due to a nonlinear optical phenomenon occurring in accordance with incidence of the pump light P1.

The terahertz waves T are electromagnetic waves having a frequency of approximately 0.01 THz to 100 THz corresponding to an intermediate range between light waves and radio waves and have intermediate properties between light waves and radio waves. The terahertz waves T are generated in a regular repetition cycle and have a pulse width of approximately several picoseconds. That is, the terahertz wave generation element 24 generates a pulsed light train including a plurality of terahertz waves T arranged at predetermined time intervals (pulse intervals). Hereinafter, an optical system of the terahertz waves T from the terahertz wave generation element 24 to the multiplexing portion 60 will be referred to as "a terahertz wave optical system".

For example, the prism 30 is a so-called stigmatic prism or the like. For example, the prism 30 has a cross section exhibiting a triangular shape. The prism 30 has an incidence surface 30a, an emission surface 30b, and a reflection surface 30c. Each of the incidence surface 30a and the emission surface 30b obliquely intersects the reflection surface 30c. The reflection surface 30c is a total reflection surface. The sample S is held on the reflection surface 30c. The prism 30 is transparent with respect to the terahertz waves T output from the terahertz wave generation element 24. A refractive index of the prism 30 is larger than a refractive index of the sample S. For example, a material of the prism 30 is silicon or the like.

The terahertz waves T incident on the incidence surface 30a of the prism 30 are incident on the reflection surface 30c from a side opposite to the sample S, are reflected on the reflection surface 30c, and are then output to the outside from the emission surface 30b. Accordingly, information of a terahertz wave band relating to the sample S can be acquired by detecting an attenuated reflection coefficient of evanescent waves leaked out when the terahertz waves T are totally reflected on the reflection surface 30c. The sample S includes a suspension. The sample S includes a liquid and a suspended substance dispersed in the liquid. The suspended substance is not dissolved in the liquid. For example, the liquid is pure water, distilled water, a physiological saline solution, blood, ethanol, methanol, acetone, ethyl acetate, isopropanol, dioxane, dimethyl sulfoxide, dimethylformamide, formamide, formic acid, butyric acid, sulfuric acid, hydrochloric acid, acetic acid, nitric acid, trifluoroacetic acid, phosphoric acid, or the like. For example, the suspended substance is calcium sulfate (plaster), carbamazepin, theophylline, nifedipine, or the like. In the present embodiment, the liquid is pure water, and the suspended substance is nifedipine.

The optical length difference adjustment section 40 has a plurality of mirrors M4 to M8. The probe light P2 output from the branch portion 22 is sequentially reflected by each of the mirrors M4 to M8, passes through the polarizer 50, and is then incident on the multiplexing portion 60. Hereinafter, an optical system of the probe light P2 from the branch portion 22 to the multiplexing portion 60 will be referred to as "a probe optical system". In the optical length difference adjustment section 40, when the mirrors M5 and M6 move, an optical length between the mirror M4 and the mirror M5 and an optical length between the mirror M6 and the mirror M7 are adjusted, and thus an optical length of the probe optical system is adjusted. Accordingly, the optical length difference adjustment section 40 adjusts a difference between "optical paths of the pump optical system and the terahertz wave optical system from the branch portion 22 to the multiplexing portion 60" and "an optical path of the probe optical system from the branch portion 22 to the multiplexing portion 60".

If the terahertz waves T output from the emission surface 30b of the prism 30 and the probe light P2 which has passed through the polarizer 50 are incident on the multiplexing portion 60, the multiplexing portion 60 multiplexes the terahertz waves T and the probe light P2 and coaxially outputs them to the light detection unit 70. For example, the multiplexing portion 60 is a film-shaped mirror or the like which is bonded to a firm support frame and is thinly stretched. For example, the multiplexing portion 60 is a pellicle or the like.

The light detection unit 70 detects the terahertz waves T output from the prism 30. Specifically, the light detection unit 70 has a terahertz wave detection element 71, a quarter-wave plate 72, a polarization separation element 73, a photodetector 74a, a photodetector 74b, a differential amplifier 75, and a lock-in amplifier 76. If the terahertz waves T and the probe light P2 output from the multiplexing portion 60 are incident on the terahertz wave detection element 71, the terahertz wave detection element 71 detects a correlation between the terahertz waves T and the probe light P2.

Specifically, the terahertz wave detection element 71 includes an electro-optic crystal. If the terahertz waves T and the probe light P2 are incident on the terahertz wave detection element 71, double refraction is induced in the terahertz wave detection element 71 due to a Pockels effect in accordance with propagation of the terahertz waves T. The probe light P2, of which a polarization state changes due to the double refraction, is output from the terahertz wave detection element 71. The amount of double refraction at this time depends on an electric field strength of the terahertz waves T. For this reason, the amount of change in polarization state of the probe light P2 in the terahertz wave detection element 71 depends on the electric field strength of the terahertz waves T.

The probe light P2 output from the terahertz wave detection element 71 passes through the quarter-wave plate 72 and is incident on the polarization separation element 73. For example, the polarization separation element 73 is a Wollaston prism or the like. The polarization separation element 73 separates the incident probe light P2 into two polarization components orthogonal to each other and outputs them.

Each of the photodetector 74a and the photodetector 74b includes a photodiode, for example. Each of the photodetector 74a and the photodetector 74b detects power of the two polarization components of the probe light P2 and outputs an electrical signal having a value corresponding to the detected power to the differential amplifier 75.

The differential amplifier 75 inputs electrical signals respectively output from the photodetector 74a and the photodetector 74b and outputs an electrical signal having a value corresponding to the difference between values of the respective electrical signals to the lock-in amplifier 76. The lock-in amplifier 76 synchronously detects electrical signals output from the differential amplifier 75 at a repetition frequency of passing and blocking of the pump light P1 in the chopper 23. A signal output from the lock-in amplifier 76 has a value which depends on the electric field strength of the terahertz waves T. In this manner, the light detection unit 70 detects a correlation between the terahertz waves T and the probe light P2 and detects an electric field amplitude of the terahertz waves T.

The processing unit 80 is electrically connected to the lock-in amplifier 76. The processing unit 80 acquires information relating to the sample S on the basis of a detection result detected by the light detection unit 70. The processing unit 80 is constituted of a central processing unit (CPU), a read only memory (ROM), a random access memory (RAM), and the like.

Figure 2:
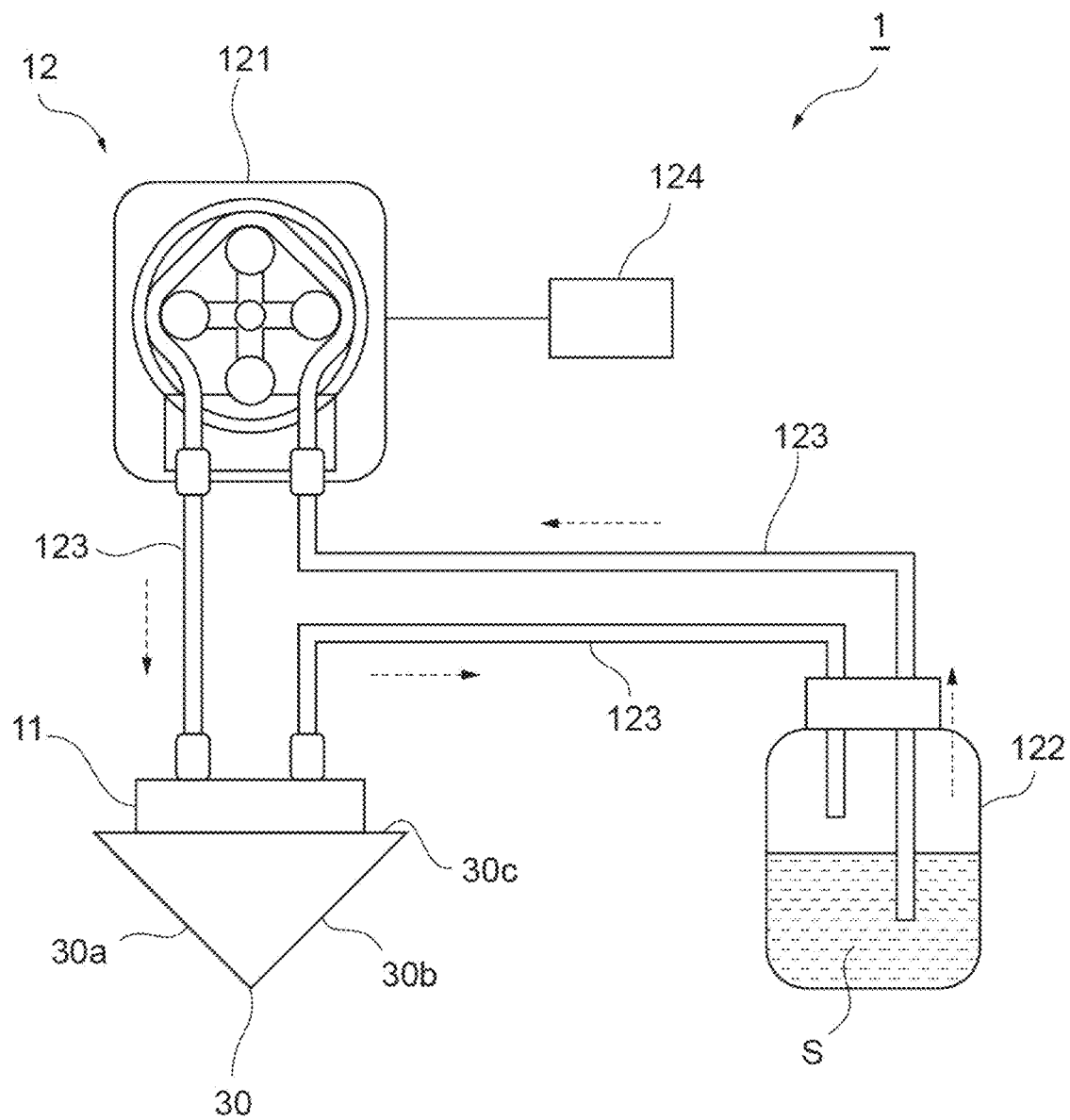
FIG. 2 is a view of a constitution of an adjustment unit of the first embodiment.

[Adjustment unit] Hereinafter, a first horizontal direction and a second horizontal direction orthogonal to each other will be respectively referred to as an X axis direction and a Y axis direction, and a vertical direction will be referred to as a Z axis direction. As illustrated in FIG. 2, the ATR apparatus 1 includes a holding unit 11 and an adjustment unit 12. In FIG. 1, illustration thereof is omitted. The holding unit 11 holds the sample S on the reflection surface 30c of the prism 30. The adjustment unit 12 includes a pump 121, a container 122, a plurality of tubes 123, and an output control unit 124.

The pump 121 is connected to each of the container 122 and the holding unit 11 through the tubes 123. The holding unit 11 is connected to the container 122 through the tube 123. The sample S is accommodated in the container 122. The sample S circulates between the pump 121, the container 122, and the holding unit 11 due to suctioning and pressure-feeding of the pump 121.

The output control unit 124 controls an output of the pump 121. If the output of the pump 121 is increased, a flow velocity of the sample S between the pump 121, the container 122, and the holding unit 11 increases. If the output of the pump 121 is decreased, the flow velocity of the sample S between the pump 121, the container 122, and the holding unit 11 decreases. The output control unit 124 is constituted of a central processing unit (CPU), a read only memory (ROM), a random access memory (RAM), and the like.

Figure 4:
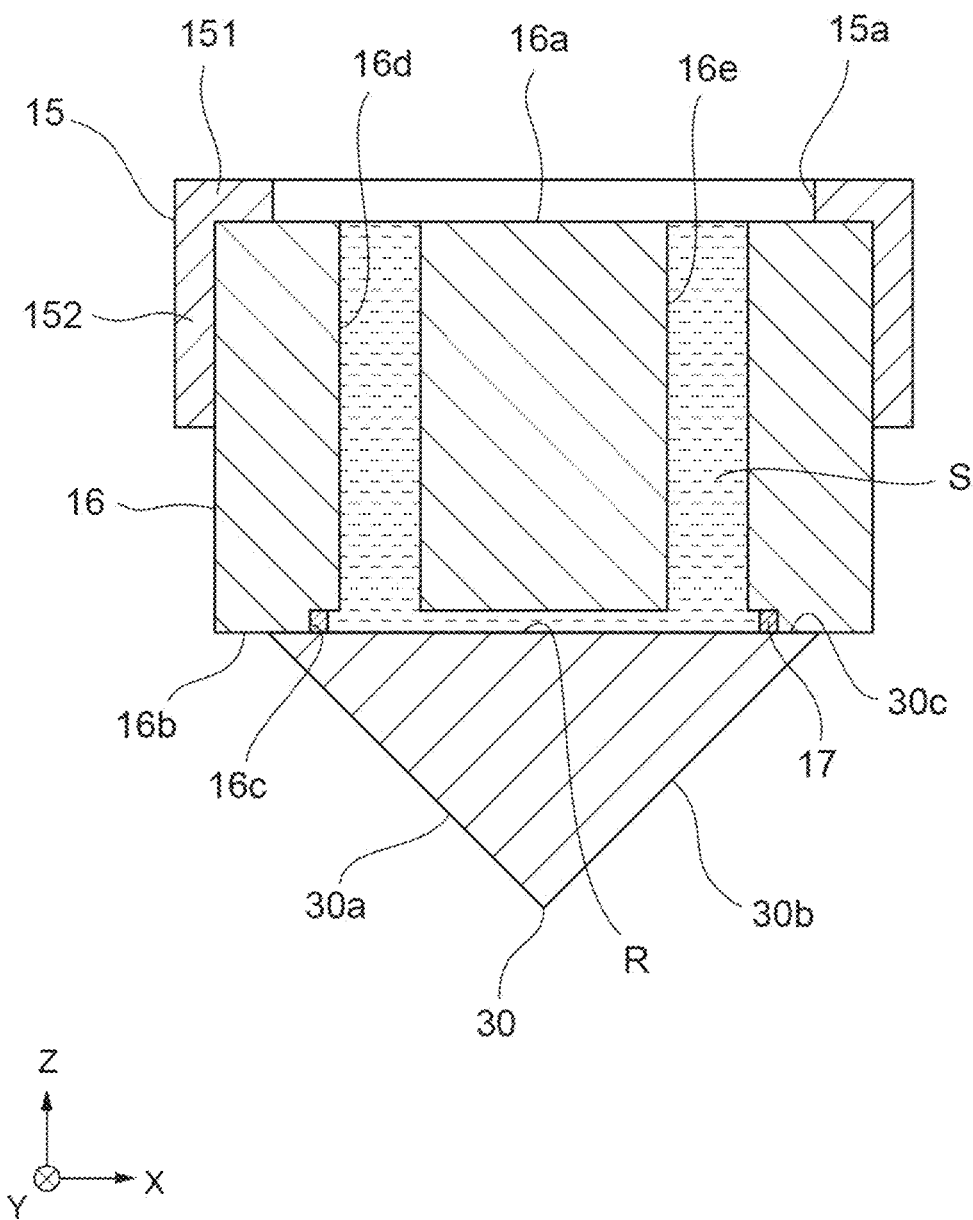
FIG. 4 is a cross-sectional view along line IV-IV in FIG. 3.

[Holding unit] As illustrated in FIG. 3, the holding unit 11 has a substrate 13, a pair of support bodies 14, an attachment portion 15, a holder 16, and a seal member 17 (refer to FIG. 4). The substrate 13 holds the prism 30 such that the reflection surface 30c is orthogonal to the Z axis direction, and the incidence surface 30a and the emission surface 30b intersect the X axis direction. The reflection surface 30c is substantially flush with a surface 13a of the substrate 13. The terahertz waves T can be incident on the incidence surface 30a and the terahertz waves T can be emitted from the emission surface 30b on a rear surface 13b side of the substrate 13.

Each of the support bodies 14 is fixed to the surface 13a of the substrate 13. The pair of support bodies 14 are disposed on both sides with respect to the prism 30 in the Y axis direction. For example, each of the support bodies 14 exhibits a rectangular parallelepiped shape having the X axis direction as a length direction thereof. A pin 141 is provided on each of placement surfaces 14a in each of the support bodies 14 on a side opposite to the substrate 13.

The attachment portion 15 includes a plate body 151, a cylinder body 152, and a pair of fixing members 153. For example, the plate body 151 exhibits a rectangular plate shape. The plate body 151 has the Y axis direction as a length direction thereof and has the Z axis direction as a thickness direction thereof. A width of the plate body 151 in the X axis direction is substantially the same as widths of the support bodies 14 in the X axis direction. A width of the plate body 151 in the Y axis direction is substantially the same as a distance between respective end surfaces of the pair of support bodies 14 (end surfaces on a side opposite to the prism in the Y axis direction) in the Y axis direction. A penetration hole 15a is formed in the plate body 151. When viewed in the Z axis direction, for example, the penetration hole 15a exhibits a rectangular shape having the X axis direction as a length direction thereof.

The cylinder body 152 is provided on one main surface of the plate body 151. For example, the cylinder body 152 exhibits a rectangular cylinder shape. The cylinder body 152 extends in the Z axis direction. When viewed in the Z axis direction, for example, the cylinder body 152 has the X axis direction as a length direction thereof. When viewed in the Z axis direction, the cylinder body 152 surrounds the penetration hole 15a of the plate body 151. A width of the cylinder body 152 in the Y axis direction is smaller than the distance between the pair of support bodies 14 in the Y axis direction. The cylinder body 152 is fixed to the plate body 151.

Each of the fixing members 153 is provided on a side opposite to the cylinder body 152 with respect to the plate body 151. The pair of fixing members 153 are provided on both sides with respect to the penetration hole 15a and the cylinder body 152 in the Y axis direction. Each of the fixing members 153 penetrates the plate body 151.

The holder 16 exhibits a rectangular parallelepiped shape having the X axis direction as a length direction thereof. The holder 16 is accommodated inside the cylinder body 152. The plate body 151 of the attachment portion 15 is placed on the placement surfaces 14a of the respective support bodies 14 such that the cylinder body 152 accommodating the holder 16 is positioned between the plate body 151 and the prism 30. Each of the fixing members 153 is fixed to the pin 141 provided in each of the support bodies 14. Accordingly, the holder 16 is attached to the prism 30.

As illustrated in FIG. 4, the holder 16 has a first main surface 16a orthogonal to the Z axis direction, and a second main surface 16b on a side opposite to the first main surface 16a. The first main surface 16a is exposed from the penetration hole 15a of the plate body 151. The second main surface 16b protrudes from an end portion in the cylinder body 152 on a side opposite to the plate body 151.

The holder 16 has a recessed portion 16c, an introduction hole 16d, and an outlet hole 16e. The recessed portion 16c is formed on the second main surface 16b. The recessed portion 16c is recessed from the second main surface 16b by a predetermined depth. When viewed in the Z axis direction, for example, the recessed portion 16c exhibits a rectangular shape having the X axis direction as a length direction thereof. The introduction hole 16d and the outlet hole 16e are arranged in the Z axis direction.

The introduction hole 16d communicates with the recessed portion 16c. The introduction hole 16d extends in the Z axis direction. The introduction hole 16d penetrates the holder 16 in the Z axis direction. The introduction hole 16d opens on the first main surface 16a and a bottom surface of the recessed portion 16c. When viewed in the Z axis direction, for example, the introduction hole 16d exhibits a circular shape. The tube 123 is connected to the opening of the introduction hole 16d on the first main surface 16a (refer to FIG. 2).

The outlet hole 16e communicates with the recessed portion 16c. The outlet hole 16e extends in the Z axis direction. The outlet hole 16e penetrates the holder 16 in the Z axis direction. The outlet hole 16e opens on the first main surface 16a and the bottom surface of the recessed portion 16c. When viewed in the Z axis direction, for example, the outlet hole 16e exhibits a circular shape. The tube 123 is connected to the opening of the outlet hole 16e on the first main surface 16a (refer to FIG. 2).

The holder 16 is disposed on the reflection surface 30c such that the second main surface 16b faces the reflection surface 30c of the prism 30. A part of the holder 16 on the first main surface 16a side is held by the cylinder body 152 of the attachment portion 15. The first main surface 16a comes into contact with the plate body 151 of the attachment portion 15. The holder 16 is pressurized against the reflection surface 30c by the attachment portion 15. The recessed portion 16c of the holder 16 and the reflection surface 30c define an accommodation space R accommodating the sample S. The sample S flows through the introduction hole 16d to be introduced into the accommodation space R. The sample flows through the outlet hole 16e to be lead out from the accommodation space R.

The holder 16 has transparency with respect to visible light. For example, a material of the holder 16 is acryl or the like. For example, the seal member 17 is an O-ring or the like. The seal member 17 is disposed in the recessed portion 16c. The seal member 17 extends along an outer edge of the recessed portion 16c. When viewed in the Z axis direction, the seal member 17 is disposed on an outward side from the introduction hole 16d and the outlet hole 16e. The seal member 17 seals the accommodation space R.

[Adjustment of fluidal state by adjustment unit] During a period in which the light detection unit 70 detects the terahertz waves T, regarding the sample S held on the reflection surface 30c, the adjustment unit 12 adjusts the fluidal state of the sample S to a first fluidal state in order to acquire a first detection result relating to the sample S in the first fluidal state and adjusts the fluidal state of the sample S to a second fluidal state in order to acquire a second detection result relating to the sample S in the second fluidal state.

The fluidal state of the sample S denotes kinetic energy of the sample S held on the reflection surface 30c of the prism 30. When kinetic energy of the sample S is large, the fluidal state of the sample S is regarded to be strong, and when kinetic energy of the sample S is small, the fluidal state of the sample S is regarded to be weak. For example, when the flow velocity of the sample S is large, the fluidal state of the sample S is strong, and when the flow velocity of the sample S is weak, the fluidal state of the sample S is weak. In addition, for example, when the sample S is strongly stirred, the fluidal state of the sample S is strong, and when the sample S is weakly stirred, the fluidal state of the sample S is weak.

When the fluidal state of the sample S is strong, the suspended substance in the sample S is likely to uniformly disperse in the sample S. When the fluidal state of the sample S is weak, the suspended substance in the sample S is likely to precipitate in the sample S. When the fluidal state of the sample S is strong, the amount of suspended substance at a position closer to the reflection surface 30c (in the present embodiment, a position closer to the reflection surface 30c than the bottom surface of the recessed portion 16c in the accommodation space R) relatively decreases, and the amount of liquid at a position closer to the reflection surface 30c relatively increases. When the fluidal state of the sample S is weak, the amount of suspended substance at a position closer to the reflection surface 30c relatively increases, and the amount of liquid at a position closer to the reflection surface 30c relatively decreases.

The adjustment unit 12 causes the sample S to circulate between the container 122 and the holder 16. Specifically, the output control unit 124 drives the pump 121. The pump 121 causes the sample S to circulate from the outlet hole 16e to the introduction hole 16d. Specifically, if the pump 121 is driven, the sample S accommodated in the container 122 is supplied to the introduction hole 16d of the holder 16 via the tube 123 due to suctioning of the pump 121. The sample S supplied to the introduction hole 16d flows through the introduction hole 16d to be introduced into the accommodation space R. The sample S which has been introduced into the accommodation space R passes through the accommodation space R and flows through the outlet hole 16e to be lead out from the accommodation space R. The sample S which has been lead out from the outlet hole 16e is supplied to the container 122 again via the tube 123 due to pressure-feeding of the pump 121. The sample S which has been supplied to the container 122 is supplied to the introduction hole 16d again due to suctioning of the pump 121. In this manner, in the ATR apparatus 1, a circulation path for the sample S is formed.

When the first detection result relating to the sample S is acquired, the output control unit 124 sets the fluidal state of the sample S held on the reflection surface 30c (the sample S accommodated in the accommodation space R) to the first fluidal state. The output control unit 124 maintains the first fluidal state of the sample S for a predetermined period. Specifically, the output control unit 124 increases the flow velocity of the sample S in the circulation path by increasing the output of the pump 121. The output control unit 124 maintains the increased flow velocity of the sample S in the circulation path for a predetermined period by maintaining the increased output of the pump 121 for a predetermined period.

When the second detection result relating to the sample S is acquired, the output control unit 124 sets the fluidal state of the sample S held on the reflection surface 30c (the sample S accommodated in the accommodation space R) to the second fluidal state. The first fluidal state is stronger than the second fluidal state. The output control unit 124 maintains the second fluidal state of the sample S for a predetermined period. Specifically, the output control unit 124 decreases the flow velocity of the sample S in the circulation path by decreasing the output of the pump 121. The flow velocity of the sample S when the first detection result relating to the sample S is acquired is larger than the flow velocity of the sample S when the second detection result relating to the sample S is acquired. The output control unit 124 maintains the decreased flow velocity of the sample S in the circulation path for a predetermined period by maintaining the decreased output of the pump 121 for a predetermined period.

In the present embodiment, the first detection result is a detection result relating to a liquid in the sample S. For example, the first detection result is data detected by the light detection unit 70 and is data for calculating spectral information of the liquid in the sample S. In the present embodiment, the second detection result is a detection result relating to a suspended substance in the sample S. For example, the second detection result is data detected by the light detection unit 70 and is data for calculating spectral information of the suspended substance in the sample S.

As above, the ATR apparatus 1 is a flow-through-type apparatus capable of continuously monitoring parameters required for quality control of the sample S, for example. It is easy to introduce such an ATR apparatus 1 into a manufacturing process.

[Operation and effects of ATR apparatus] As described above, in the ATR apparatus 1, the sample S including a suspension is held on the reflection surface 30c of the prism 30. The adjustment unit 12 adjusts the fluidal state of the sample S to the first fluidal state in order to acquire the first detection result relating to the sample S in the first fluidal state and adjusts the fluidal state of the sample S to the second fluidal state in order to acquire the second detection result relating to the sample S in the second fluidal state. Accordingly, the amount of suspended substance in the sample S at a position closer to the reflection surface 30c can be relatively decreased by making the first fluidal state relatively strong, and the detection result relating to the sample S having a relatively small suspended substance content can be acquired as the first detection result. In addition, the amount of suspended substance in the sample S at a position closer to the reflection surface 30c can be relatively increased by making the second fluidal state relatively weak, and the detection result relating to the sample S having a relatively large suspended substance content can be acquired as the second detection result. Accordingly, for example, without separately preparing the samples S, both the detection result for close to the liquid in the sample S and the detection result for close to the suspended substance in the sample S can be acquired. Thus, according to the ATR apparatus 1, detailed information relating to the sample S can be easily acquired. For example, spectral information of relating to the liquid in the sample S and spectral information of relating to the suspended substance in the sample S can be acquired on the basis of the first detection result and the second detection result. Therefore, detailed evaluation of such a suspension in the sample S can be easily performed by multilaterally analyzing and utilizing information relating to the sample S.

In the ATR apparatus 1, the holding unit 11 includes the holder 16 disposed on the reflection surface 30c. The holder 16 has the recessed portion 16c defining the accommodation space R of the sample S together with the reflection surface 30c, the introduction hole 16d communicating with the recessed portion 16c and allowing the sample S to be introduced into the accommodation space R to flow therethrough, and the outlet hole 16e communicating with the recessed portion 16c and allowing the sample S to be lead out from the accommodation space R to flow therethrough. The adjustment unit 12 includes the pump 121 causing the sample S to circulate from the outlet hole 16e to the introduction hole 16d, and the output control unit 124 controlling the output of the pump 121. Accordingly, the sample S held on the reflection surface 30c can be caused to flow by the pump 121. In addition, the flow velocity of the sample S held on the reflection surface 30c can be controlled and the fluidal state of the sample S can be adjusted by controlling the output of the pump 121.

In the ATR apparatus 1, the holder 16 has transparency with respect to visible light. Accordingly, the fluidal state of the sample S held on the reflection surface 30c can be visually observed.

The ATR apparatus 1 includes the light output unit 20 outputting the terahertz waves T from a side opposite to the sample S to the reflection surface 30c, and the light detection unit 70 detecting the terahertz waves T reflected on the reflection surface 30c. The adjustment unit 12 adjusts the fluidal state of the sample S during a period in which the light detection unit 70 detects the terahertz waves T. Accordingly, during a period of detection of the terahertz waves T, the first detection result and the second detection result relating to the sample S can be easily acquired.

In the ATR apparatus 1, the light output from the light output unit 20 is the terahertz waves T. Accordingly, using the terahertz waves T, the first detection result and the second detection result relating to the sample S can be accurately acquired. Specifically, when the terahertz waves T is used, a range of evanescent waves (a range in the Z axis direction) leaked out on the reflection surface 30c relatively increases. Accordingly, a measurable region widens.

[ATR method] Next, an attenuated total reflectance spectroscopy method performed in the ATR apparatus 1 in order to acquire information relating to the sample S (which will hereinafter be referred to as "an ATR method") will be described.

Figure 5:
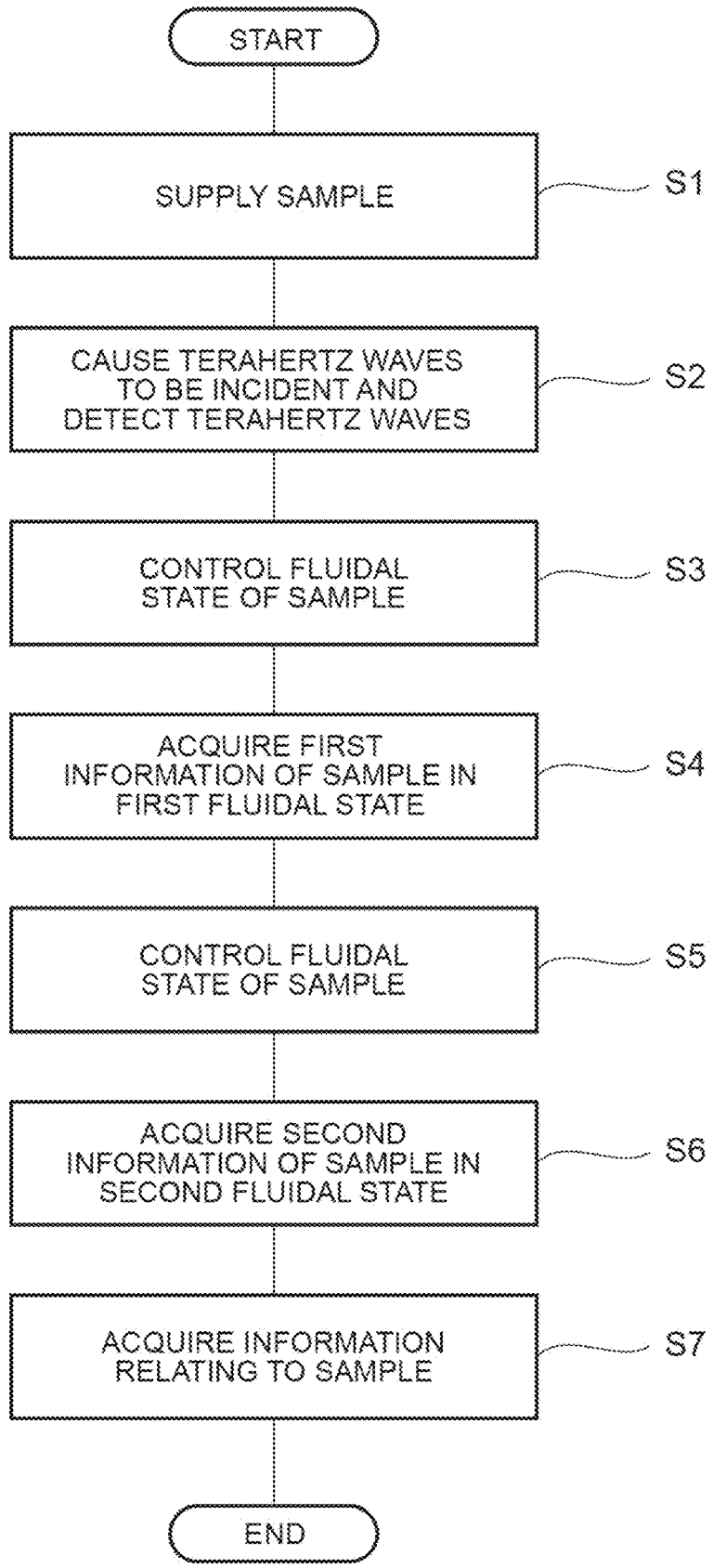
FIG. 5 is a flowchart of an attenuated total reflectance spectroscopy method of the first embodiment.

As illustrated in FIG. 5, first, the sample S is supplied to the accommodation space R (Step S1). In Step S1, after the amount of sample S accommodated in the container 122 is secured, the pump 121 is driven by the output control unit 124. If the pump 121 is driven, the sample S circulates through the circulation path. The sample S flows in the accommodation space R. Accordingly, the sample S is held on the reflection surface 30c. Step S1 corresponds to a first step.

Subsequently, the terahertz waves T are output from a side opposite to the sample S to the reflection surface 30c and the terahertz waves T reflected on the reflection surface 30c are detected (Step S2). In Step S2, the terahertz waves T are caused to be incident on the incidence surface 30a of the prism 30 by the light output unit 20. In Step S2, a correlation between the terahertz waves T output from the multiplexing portion 60 by the light detection unit 70 and the probe light P2 is detected, and the electric field amplitude of the terahertz waves T is detected. In Step S2, the terahertz waves T are continuously output to the reflection surface 30c, and the terahertz waves T reflected on the reflection surface 30c are continuously detected. Step S2 corresponds to a sixth step.

Subsequently, the fluidal state of the sample S is adjusted such that the sample S held on the reflection surface 30c is in the first fluidal state (Step S3). Step S3 corresponds to a second step. Subsequently, the first detection result relating to the sample S in the first fluidal state is acquired (Step S4). Step S4 corresponds to a third step. Subsequently, the fluidal state of the sample S is adjusted such that the sample S held on the reflection surface 30c is in the second fluidal state (Step S5). Step S5 corresponds to a fourth step. Subsequently, the second detection result relating to the sample S in the second fluidal state is acquired (Step S6). Step S6 corresponds to a fifth step. Subsequently, information relating to the sample S is acquired on the basis of the first detection result and the second detection result (Step S7). In Step S7, for example, spectral information relating to each of the liquid and the suspended substance in the sample S is calculated. Step S7 corresponds to a seventh step.

Step S3 to Step S6 are performed during a period in which Step S2 is performed, that is, during a period in which the terahertz waves T are output to the reflection surface 30c and the terahertz waves T reflected on the reflection surface 30c are detected.

[Operation and effects of ATR method] As described above, in the ATR method, in Step S4, the first detection result relating to the sample S in the first fluidal state is acquired, and in Step S6, the second detection result relating to the sample S in the second fluidal state is acquired. Accordingly, in Step S3, the amount of suspended substance in the sample S at a position closer to the reflection surface 30c can be relatively decreased by making the first fluidal state relatively strong, and in Step S4, the detection result relating to the sample S having a relatively small suspended substance content can be acquired as the first detection result. In addition, in Step S5, the amount of suspended substance in the sample S at a position closer to the reflection surface 30c can be relatively increased by making the second fluidal state relatively weak, and in Step S6, the detection result relating to the sample S having a relatively large suspended substance content can be acquired as the second detection result. Accordingly, for example, without separately preparing the samples S, both the detection result for close to the liquid in the sample S and the detection result for close to the suspended substance in the sample S can be acquired. Thus, according to the ATR method, detailed information relating to the sample S can be easily acquired.

In the ATR method, the first fluidal state is stronger than the second fluidal state. Accordingly, the first detection result and the second detection result relating to the sample S can be reliably acquired.

The ATR method includes Step S2. In Step S2, the terahertz waves T are output from a side opposite to the sample S to the reflection surface 30c, and the terahertz waves T reflected on the reflection surface 30c are detected. Step S3 to Step S6 are performed during a period in which Step S2 is performed. Accordingly, during a period of detection of the terahertz waves T, the first detection result and the second detection result relating to the sample S can be easily acquired.

In the ATR method, the light is the terahertz waves T. Accordingly, using the terahertz waves T, the first detection result and the second detection result relating to the sample S can be accurately acquired.

The ATR method includes Step S7 of acquiring information relating to the sample S on the basis of the first detection result and the second detection result. Accordingly, as described above, detailed information relating to the sample S can be easily acquired.

[Examples] FIG. 6 is a view illustrating results of the ATR method of a first example. In the first example, information relating to each of a sample A, a sample B, and a sample C (samples S) was acquired. Each of the sample A, the sample B, and the sample C was a suspension in which nifedipine (suspended substance) was dispersed in pure water (liquid). A concentration of nifedipine in the sample A was approximately 2.5 mg/ml. A concentration of nifedipine in the sample B was approximately 5.0 mg/ml. A concentration of nifedipine in the sample C was approximately 10.0 mg/ml.

(a) in FIG. 6 is a view illustrating absorption spectra obtained from the respective first detection results of the sample A, the sample B, and the sample C in the first fluidal state. (b) in FIG. 6 is a view illustrating absorption spectra obtained from the respective second detection results of the sample A, the sample B, and the sample C in the second fluidal state. As illustrated in (a) in FIG. 6, the respective absorption spectra of the sample A, the sample B, and the sample C in the first fluidal state smoothly increased as the frequency increased and they almost overlapped each other. As illustrated in (b) in FIG. 6, the respective absorption spectra of the sample A, the sample B, and the sample C in the second fluidal state had peak portions (unique peaks derived from the suspended substance) at a predetermined frequency (1.1 to 1.3 THz) and were away from each other. In this manner, in the first example, it was confirmed that the detection result relating to the liquid in the sample S could be acquired when the sample S was in the first fluidal state and the detection result relating to the suspended substance in the sample S could be acquired when the sample S was in the second fluidal state.

Figure 7:
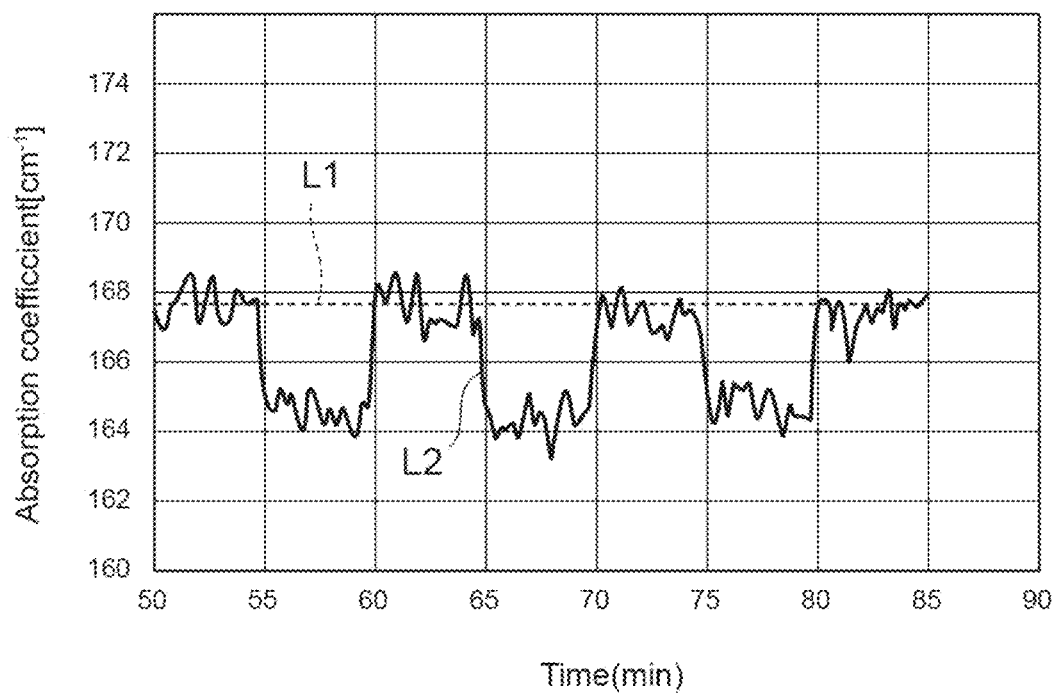
FIG. 7 is a view illustrating results of the attenuated total reflectance spectroscopy method of a second example.

FIG. 7 is a view illustrating results of the ATR method of a second example. In the second example, using a suspension as the sample S in which plaster (suspended substance) was dispersed in pure water (liquid), the fluidal state of the sample S was adjusted such that the fluidal state of the sample S alternately switched between the first fluidal state and the second fluidal state. FIG. 7 is a view illustrating change over time in the absorption spectrum of the sample S corresponding to a predetermined frequency (for example, approximately 0.5 THz). In FIG. 7, the line L1 indicates the absorption spectrum corresponding to the liquid of the sample S, that is, the liquid when the suspended substance is not dispersed in the sample S (in the present example, pure water), and the line L2 indicates change over time in the absorption spectrum corresponding to the sample S. As illustrated in FIG. 7, in the line L2, the absorption spectrum of a part corresponding to the first fluidal state (for example, 50 to 55 min) substantially coincides with the absorption spectrum of the liquid of the sample S. In the line L2, a part corresponding to the second fluidal state (for example, 55 to 60 min) is away from the line L1. In this manner, in the second example, it was confirmed that the detection result relating to the liquid in the sample S could be acquired when the sample S was in the first fluidal state and the detection result relating to the suspended substance in the sample S could be acquired when the sample S was in the second fluidal state.

Figure 8:
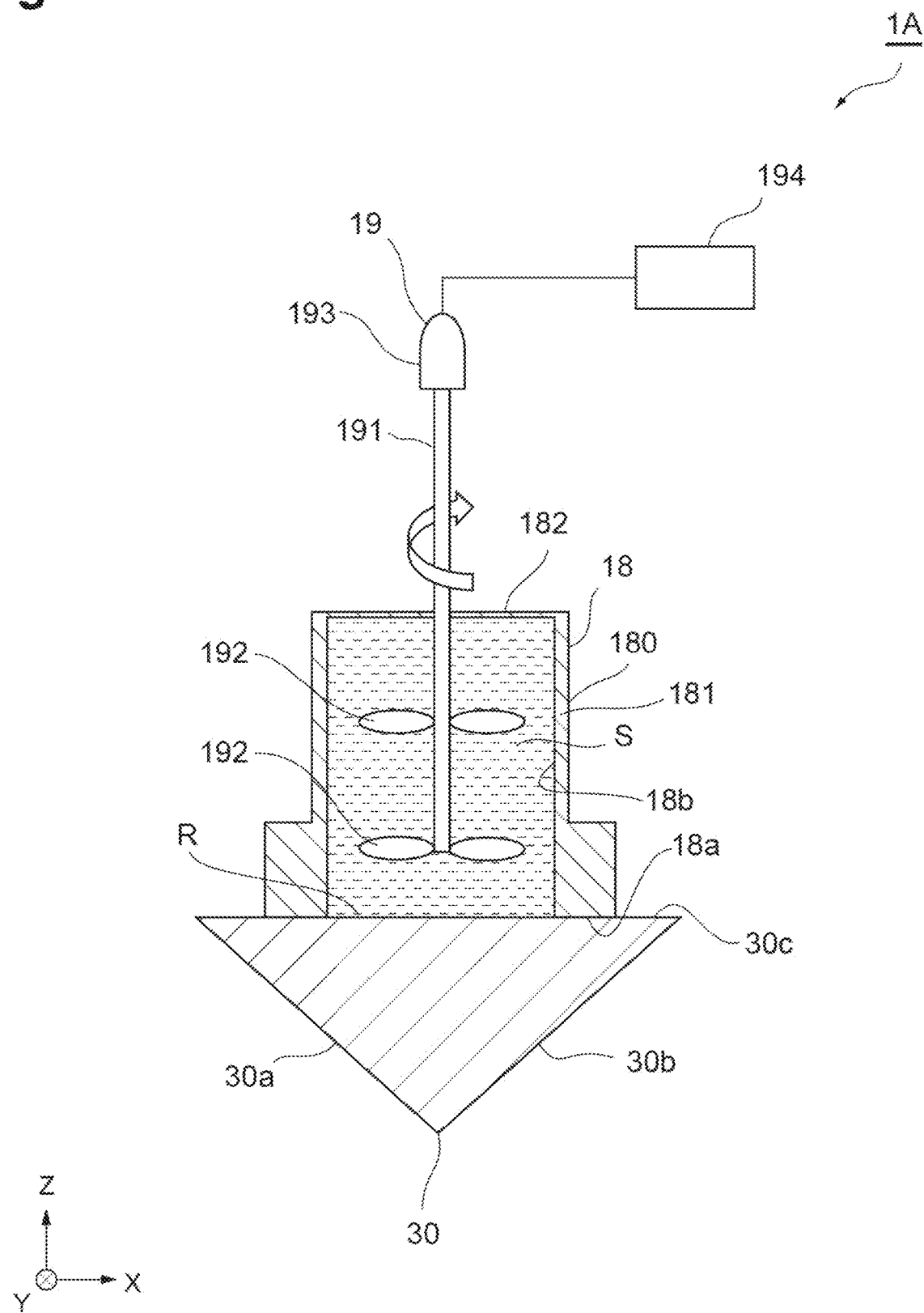
FIG. 8 is a cross-sectional view of the holding unit and the adjustment unit of a modification example.

[Modification examples] The present disclosure is not limited to the first embodiment described above. As illustrated in FIG. 8, an ATR apparatus 1A may include a holding unit 18 in place of the holding unit 11. The ATR apparatus 1A may include an adjustment unit 19 in place of the adjustment unit 12. Since other constitutions of the ATR apparatus 1A are the same as those of the ATR apparatus 1, detailed description thereof will be omitted.

The holding unit 18 includes a holder 180. The holder 180 has a side wall portion 181 and a bottom wall portion 182. The side wall portion 181 exhibits a tubular shape. The bottom wall portion 182 seals one opening of the side wall portion 181. The other opening of the side wall portion 181 opens. The holder 180 is disposed on the reflection surface 30c such that an end surface 18a in the side wall portion 181 on a side opposite to the bottom wall portion 182 faces the reflection surface 30c of the prism 30. An inner surface 18b of the holder 180 defines the accommodation space R accommodating the sample S together with the reflection surface 30c.

The adjustment unit 19 has a shaft 191, a plurality of propellers 192, a motor 193, and an output control unit 194. The shaft 191 extends in the Z axis direction. The shaft 191 penetrates the bottom wall portion 182 and extends to the accommodation space R. Each of the propellers 192 is fixed to the shaft 191 in the accommodation space R. The motor 193 is provided in the shaft 191 outside the accommodation space R. The motor 193 rotates the shaft 191. The output control unit 194 controls an output of the motor 193. The output control unit 194 is constituted of a central processing unit (CPU), a read only memory (ROM), a random access memory (RAM), and the like.

The adjustment unit 19 can adjust the fluidal state of the sample S. The adjustment unit 19 stirs the sample S in the accommodation space R. Specifically, the output control unit 194 drives the motor 193. If the motor 193 is driven, the shaft 191 having the plurality of propellers 192 fixed thereto rotates. The sample S accommodated in the accommodation space R is stirred by each of the propellers 192.

When the first detection result relating to the sample S is acquired, the output control unit 194 sets the fluidal state of the sample S held on the reflection surface 30c (the sample S accommodated in the accommodation space R) to the first fluidal state. The output control unit 194 maintains the first fluidal state of the sample S for a predetermined period. Specifically, the output control unit 194 increases the rotational speed of the shaft 191 by increasing the output of the motor 193. The output control unit 194 maintains the increased rotational speed of the shaft 191 for a predetermined period by maintaining the increased output of the motor 193 for a predetermined period.

When the second detection result relating to the sample S is acquired, the output control unit 194 sets the fluidal state of the sample S held on the reflection surface 30c (the sample S accommodated in the accommodation space R) to the second fluidal state. The output control unit 194 maintains the second fluidal state of the sample S for a predetermined period. Specifically, the output control unit 194 decreases the rotational speed of the shaft 191 by decreasing the output of the motor 193. The rotational speed of the shaft 191 when the first detection result relating to the sample S is acquired is larger than the rotational speed of the shaft 191 when the second detection result relating to the sample S is acquired. The output control unit 194 maintains the decreased rotational speed of the shaft 191 for a predetermined period by maintaining the decreased output of the motor 193 for a predetermined period.

According to the ATR apparatus 1A, similar to the ATR apparatus 1, detailed information relating to the sample S can be easily acquired.

In the first embodiment, an example in which the output control unit 124 increases or decreases the output of the pump 121 has been described, but the output control unit 124 may stop the flow of the sample S in the circulation path by stopping the pump 121. That is, the second fluidal state may be a stationary state. Accordingly, the suspended substance in the sample S held on the reflection surface 30c can be precipitated, and a detection result relating to a precipitate constituted of the suspended substance can be acquired as the second detection result. The output control unit 194 of a modification example may also stop rotation of each of the propellers 192 by stopping the motor 193.

In the first embodiment, an example in which the sample S includes nifedipine has been described, but the sample S may include a plurality of kinds of suspended substances having specific gravities different from each other. For example, the sample S may include each of a first suspended substance having a first specific gravity, a second suspended substance having a second specific gravity, and a third suspended substance having a third specific gravity. The output control unit 124 may adjust the fluidal state of the sample S such that the sample S held on the reflection surface 30c is in diverse fluidal states (for example, the first fluidal state, the second fluidal state, and the third fluidal state). Accordingly, for example, in the first suspended substance, the second suspended substance, and the third suspended substance, the fluidal state of the sample S can be changed in accordance with the specific gravity of the suspended substance (measurement object). That is, diverse dispersion states, precipitation states, or the like of the suspended substance in the sample S at a position closer to the reflection surface 30c can be adjusted. Therefore, for example, in a plurality of kinds of suspended substances, without separately preparing the samples S including the suspended substance (measurement object), a plurality of detection results relating to the samples S including a plurality of kinds of suspended substances can be easily acquired.

In the first embodiment, an example in which the holder 16 has transparency with respect to visible light has been described, but the holder 16 may not have transparency with respect to visible light. For example, a material of the holder 16 may be a fluororesin or the like such as Teflon (registered trademark). For example, a material of the holder 16 may be aluminum or the like.

In the first embodiment, an example in which the light output unit 20 outputs the terahertz waves T as light has been described, but the light output unit 20 may output UV rays or infrared rays (near-infrared rays, mid-infrared rays, or far-infrared rays). That is, the ATR apparatus 1 may be an apparatus using light not only in a terahertz band but also in a UV range or an infrared range.

In the ATR method, Step S1 may also be performed during a period in which Step S2 is performed. In addition, Step S3 and Step S4 may be performed after Step S5 and Step S6 are performed.

In the first embodiment, the prism 30 has been exemplified as an optical element, but for example, the optical element may be a plate-shaped optical member such as a slide glass, an optical fiber, or the like.

In the first embodiment, an example in which the sample S is caused to flow in one direction by the output control unit 124 driving the pump 121 in one direction both when the first detection result relating to the sample S is acquired and when the second detection result relating to the sample S is acquired has been described, but for example, the output control unit 124 may cause the sample S to flow in one direction by driving the pump 121 in one direction when the first detection result relating to the sample S is acquired, and may cause the sample S to flow in a direction opposite to the one direction by driving the pump 121 in a direction opposite to the one direction when the second detection result relating to the sample S is acquired. That is, the flow direction of the sample S may differ in each of the first fluidal state and the second fluidal state of the sample S.

In the modification example, an example in which the shaft 191 is rotated in one direction by the output control unit 194 driving the motor 193 in one direction both when the first detection result relating to the sample S is acquired and when the second detection result relating to the sample S is acquired has been described, but for example, the output control unit 194 may rotate the shaft 191 in one direction by driving the motor 193 in one direction when the first detection result relating to the sample S is acquired, and may rotate the shaft 191 in a direction opposite to the one direction by driving the motor 193 in a direction opposite to the one direction when the second detection result relating to the sample S is acquired. That is, the rotation direction of the shaft 191 may differ in each of the first fluidal state and the second fluidal state of the sample S. In addition, the adjustment unit 19 may adjust the fluidal state of the sample S by independently controlling each of the propellers 192.

Figure 9:
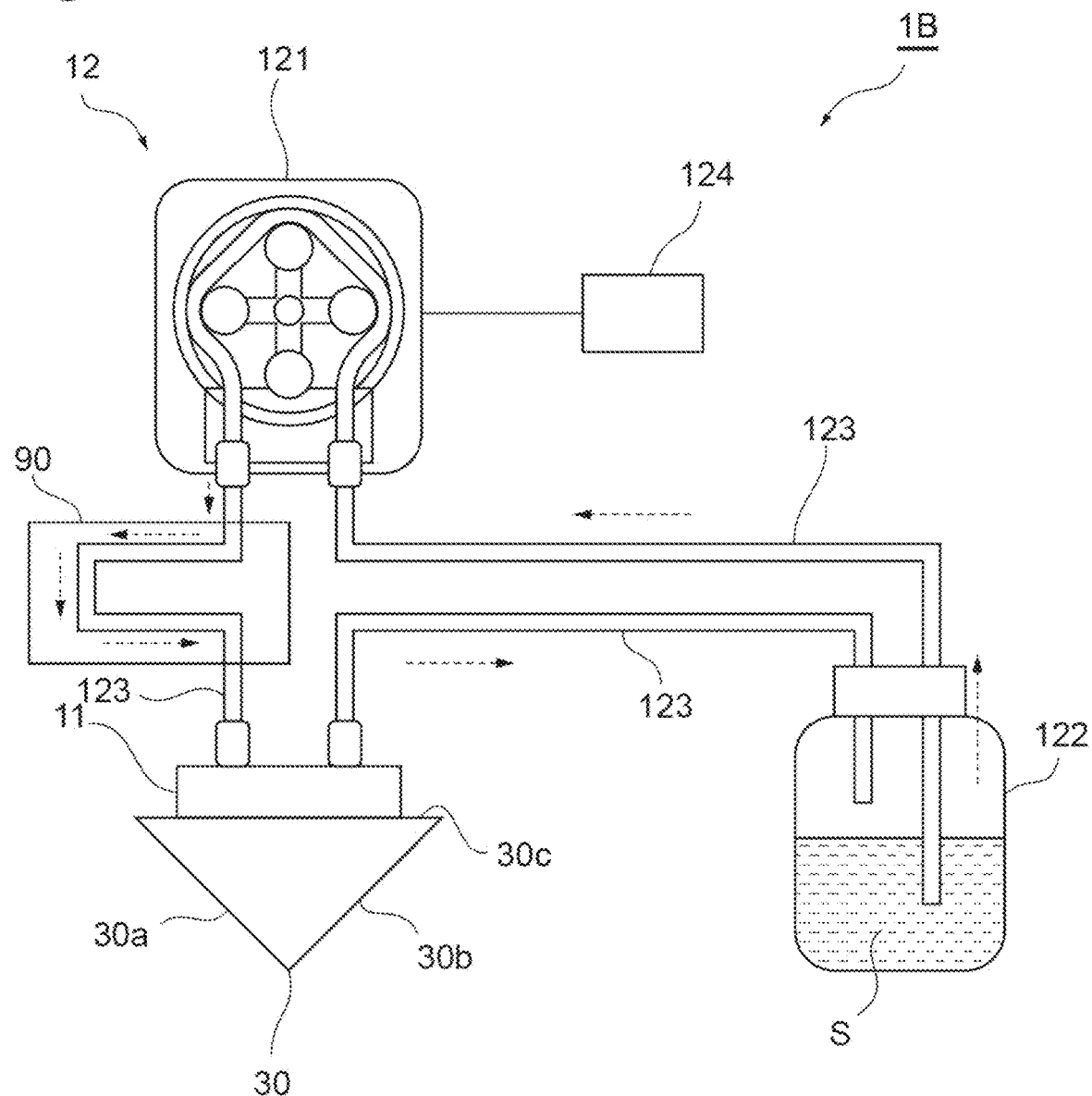
FIG. 9 is a view of a constitution of an attenuated total reflectance spectroscopy apparatus of a second embodiment.

[Second embodiment] As illustrated in FIG. 9, an attenuated total reflectance spectroscopy apparatus 1B (which will hereinafter be referred to as "an ATR apparatus 1B") differs from the ATR apparatus 1 of the first embodiment in further including a temperature adjustment unit 90. Since other constitutions of the ATR apparatus 1B are the same as those of the ATR apparatus 1, detailed description thereof will be omitted.

The temperature adjustment unit 90 is provided between the container 122 and the holding unit 11. The temperature adjustment unit 90 is provided to the tube 123 connecting the pump 121 and the holding unit 11 to each other. Hereinafter, the tube 123 connecting the pump 121 and the holding unit 11 to each other will be referred to as "an introduction tube 123". That is, the introduction tube 123 is a tube for supplying the sample S to the holding unit 11. The temperature adjustment unit 90 is provided in the introduction tube 123 at a position closer to the holding unit 11 than the pump 121.

Figure 10:
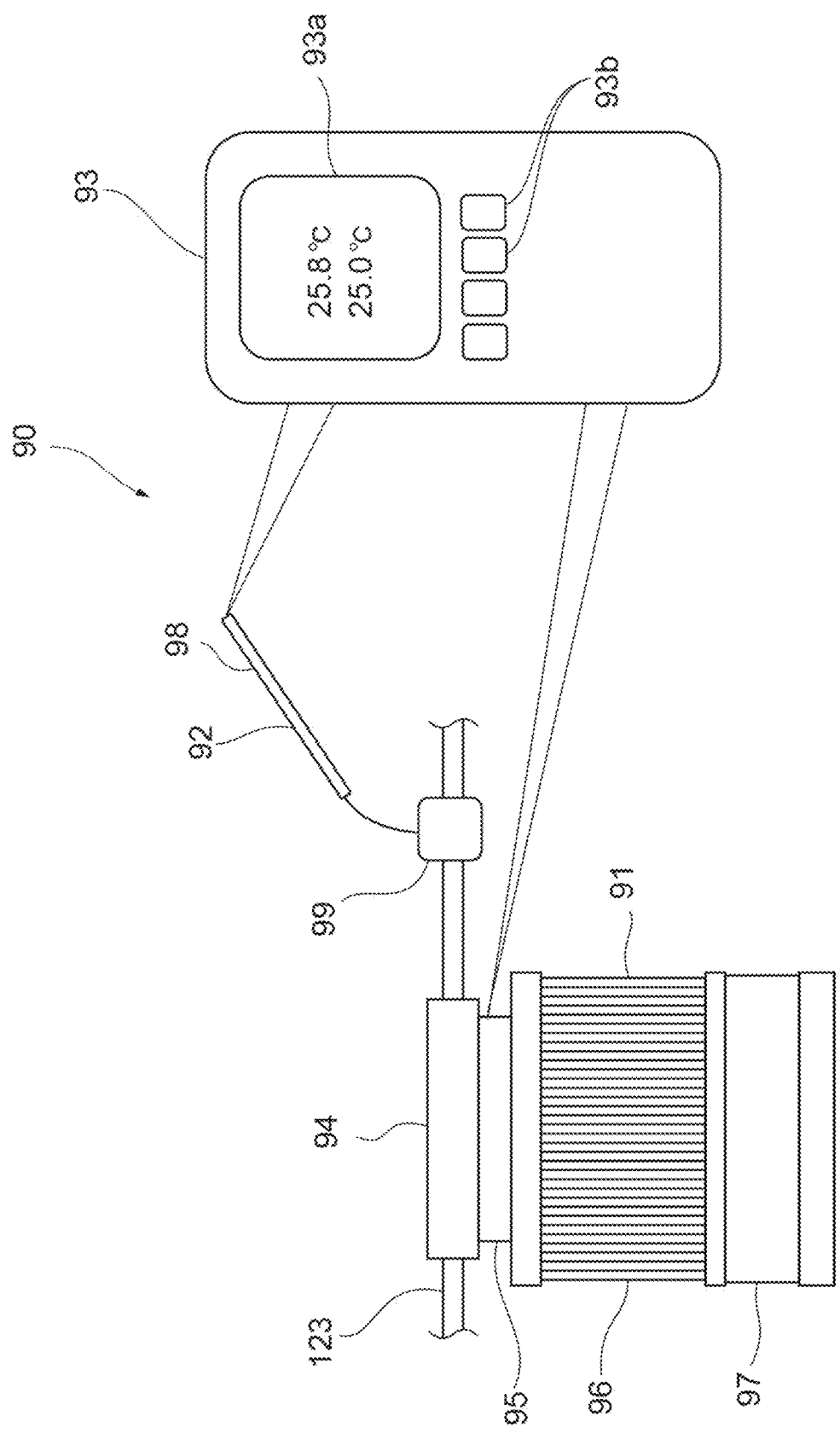
FIG. 10 is a view of a constitution of a temperature adjustment unit illustrated in FIG. 9.

The temperature adjustment unit 90 adjusts the temperature of the sample S flowing through the introduction tube 123. Specifically, as illustrated in FIG. 10, the temperature adjustment unit 90 has a heat treatment portion 91, a detection portion 92, and a controller (control unit) 93. The heat treatment portion 91 is provided outside the introduction tube 123. The heat treatment portion 91 performs heat treatment or cooling treatment with respect to the sample S flowing through the introduction tube 123.

Figure 11:
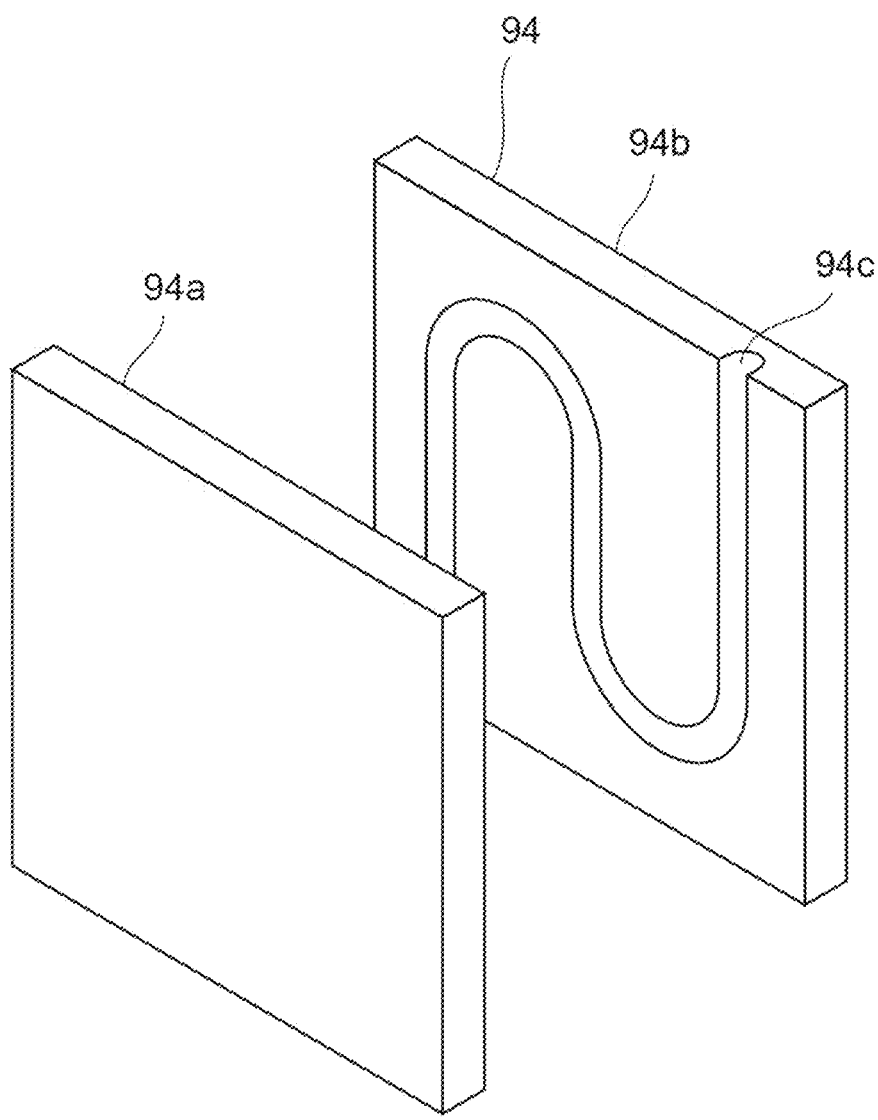
FIG. 11 is an exploded perspective view of a heat transfer portion illustrated in FIG. 10.

Specifically, the heat treatment portion 91 has a heat transfer portion 94, a Peltier element 95, a heat sink 96, and a cooling fan 97. The heat transfer portion 94 surrounds the introduction tube 123. The heat transfer portion 94 is thermally connected to the introduction tube 123. As illustrated in FIG. 11, the heat transfer portion 94 has a pair of plate members 94a and 94b. Each of the plate members 94a and 94b is constituted using a material having a relatively high thermal conductivity. For example, a material of each of the plate members 94a and 94b is aluminum, copper, gold, silver, nickel, platinum, or the like. In the present embodiment, a material of each of the plate members 94a and 94b is aluminum.

Each of the plate members 94a and 94b is provided with a groove 94c. Each of the grooves 94c extends in a meandering shape. The introduction tube 123 is sandwiched between the pair of plate members 94a and 94b in a state of being disposed in each of the grooves 94c. According to such a constitution, since a contact area between the introduction tube 123 and the heat transfer portion 94 increases, heat transfer efficiency by the heat transfer portion 94 increases. Accordingly, the temperature of the sample S flowing through the introduction tube 123 can be more effectively adjusted. For example, a heat conductive grease fills spaces between each of the grooves 94c and the introduction tube 123. As illustrated in FIG. 10, the Peltier element 95 is provided on a surface of the heat transfer portion 94. The Peltier element 95 includes an element portion including an endothermic area and an exothermic area. The Peltier element 95 is thermally connected to the heat transfer portion 94. The Peltier element 95 performs heat treatment or cooling treatment with respect to the heat transfer portion 94.

The heat sink 96 is provided on a side opposite to the heat transfer portion 94 with respect to the Peltier element 95. The heat sink 96 is thermally connected to the Peltier element 95. A refrigerant flows in the heat sink 96. The heat sink 96 prompts heat dissipation of the Peltier element 95. The cooling fan 97 is provided on a side opposite to the Peltier element 95 with respect to the heat sink 96. The cooling fan 97 is thermally connected to the heat sink 96. The cooling fan 97 cools the heat sink 96.

The detection portion 92 detects a temperature of the sample S (which will hereinafter be referred to as "a temperature of the sample S") flowing through the introduction tube 123. The detection portion 92 has a temperature sensor 98 and a seal member 99. A tip portion of the temperature sensor 98 is inserted into the introduction tube 123 between the heat transfer portion 94 and the holding unit 11. For example, the temperature sensor 98 is a thermocouple, a temperature measurement resistor, or the like. The seal member 99 is provided at a part in the introduction tube 123 where the temperature sensor 98 is inserted. The seal member 99 covers a part of the introduction tube 123 and the temperature sensor 98. The seal member 99 prevents the sample S flowing through the introduction tube 123 from leaking out to the outside of the introduction tube 123.

The controller 93 controls the output of the heat treatment portion 91. The controller 93 is electrically connected to each of the temperature sensor 98 and the Peltier element 95. The controller 93 receives a signal from the temperature sensor 98. The controller 93 performs feedback control with respect to the Peltier element 95 on the basis of the detection result by the temperature sensor 98. The controller 93 increases or decreases the output of the Peltier element 95 on the basis of the detection result by the temperature sensor 98. When the temperature of the sample S exceeds an upper limit threshold, the controller 93 transmits a cooling signal to the Peltier element 95, and the heat transfer portion 94 is cooled by the Peltier element 95. When the temperature of the sample S falls below a lower limit threshold, the controller 93 transmits a heating signal to the Peltier element 95, and the heat transfer portion 94 is heated by the Peltier element 95. The upper limit threshold and the lower limit threshold may be different from each other or may be the same as each other. The controller 93 has a central processing unit (CPU), a read only memory (ROM), a random access memory (RAM), and the like.

The controller 93 has a monitor 93a and a plurality of switches 93b. For example, the monitor 93a displays the temperature and the upper limit threshold or the lower limit threshold of the sample S. In the example illustrated in FIG. 10, the temperature of the sample S was 25.8 degrees, and the upper limit threshold and the lower limit threshold were 25.0 degrees. Each of the switches 93b has a function of instructing ON/OFF of operation of the heat treatment portion 91, heat treatment by the Peltier element 95, cooling treatment by the Peltier element 95, display of the monitor 93a, or the like. Transmission of each of a cooling signal and a heating signal to the Peltier element 95 may be automatically performed by the controller 93 or may be manually performed by the switches 93b.

As described above, the ATR apparatus 1B includes the introduction tube 123 supplying the sample S to the holding unit 11, and the temperature adjustment unit 90 adjusting the temperature of the sample S flowing through the introduction tube 123. Accordingly, the temperature of the sample S held by the holding unit 11 can be maintained to be constant by adjusting the temperature of the sample S flowing through the introduction tube 123. For this reason, an influence of temperature change in the sample S on a measurement result can be curbed. In addition, the temperature adjustment unit 90 can quickly adjust the temperature of the sample S in real time by performing heat treatment or cooling treatment with respect to the sample S flowing through the introduction tube 123 and having a relatively small volume. Therefore, detailed information relating to the sample S can be acquired with high accuracy. If the temperature of the sample S changes, the measurement result may also change. In such a case, there is concern that it will be difficult to distinguish whether change in the measurement result is caused by temperature change in the sample S or is caused by change in physical properties of the sample S. In other words, information derived from the physical properties of the sample S may be lost in change in measurement result due to temperature change in the sample S. As a result, there is concern that it will be difficult to measure information of the sample S with high accuracy. According to the ATR apparatus 1B, as described above, such problems can be favorably resolved.

The temperature adjustment unit 90 has the heat treatment portion 91 performing heat treatment or cooling treatment with respect to the sample S flowing through the introduction tube 123, the detection portion 92 detecting the temperature of the sample S flowing through the introduction tube 123, and the controller 93 controlling the output of the heat treatment portion 91. The controller 93 increases and decreases the output of the heat treatment portion 91 on the basis of the detection result by the detection portion 92. Accordingly, the temperature of the sample S flowing through the introduction tube 123 can be adjusted with high accuracy. For this reason, the temperature of the sample S held by the holding unit 11 can be maintained with high accuracy, and detailed information relating to the sample S can be acquired with higher accuracy.

The temperature adjustment unit 90 is provided in the introduction tube 123. Moreover, the temperature sensor 98 is provided between the heat transfer portion 94 and the holding unit 11. According to this constitution, the temperature of the sample S can be detected at a position relatively closer to the holding unit 11. Accordingly, for example, even if the temperature of the sample S changes between the heat transfer portion 94 and the holding unit 11 due to temperature change or the like in the environment where the ATR apparatus 1B is placed, the temperature of the sample S held by the holding unit 11 can be detected with higher accuracy. Moreover, the temperature adjustment unit 90 is provided in the introduction tube 123 at a position closer to the holding unit 11 than the pump 121. According to this constitution, the temperature of the sample S can be detected at a position even closer to the holding unit 11, and the temperature of the sample S held by the holding unit 11 can be detected with even higher accuracy.

The heat treatment portion 91 includes the Peltier element 95. Accordingly, adjustment of the temperature of the sample S flowing through the introduction tube 123 can be easily and reliably realized with high accuracy.

Figure 12:
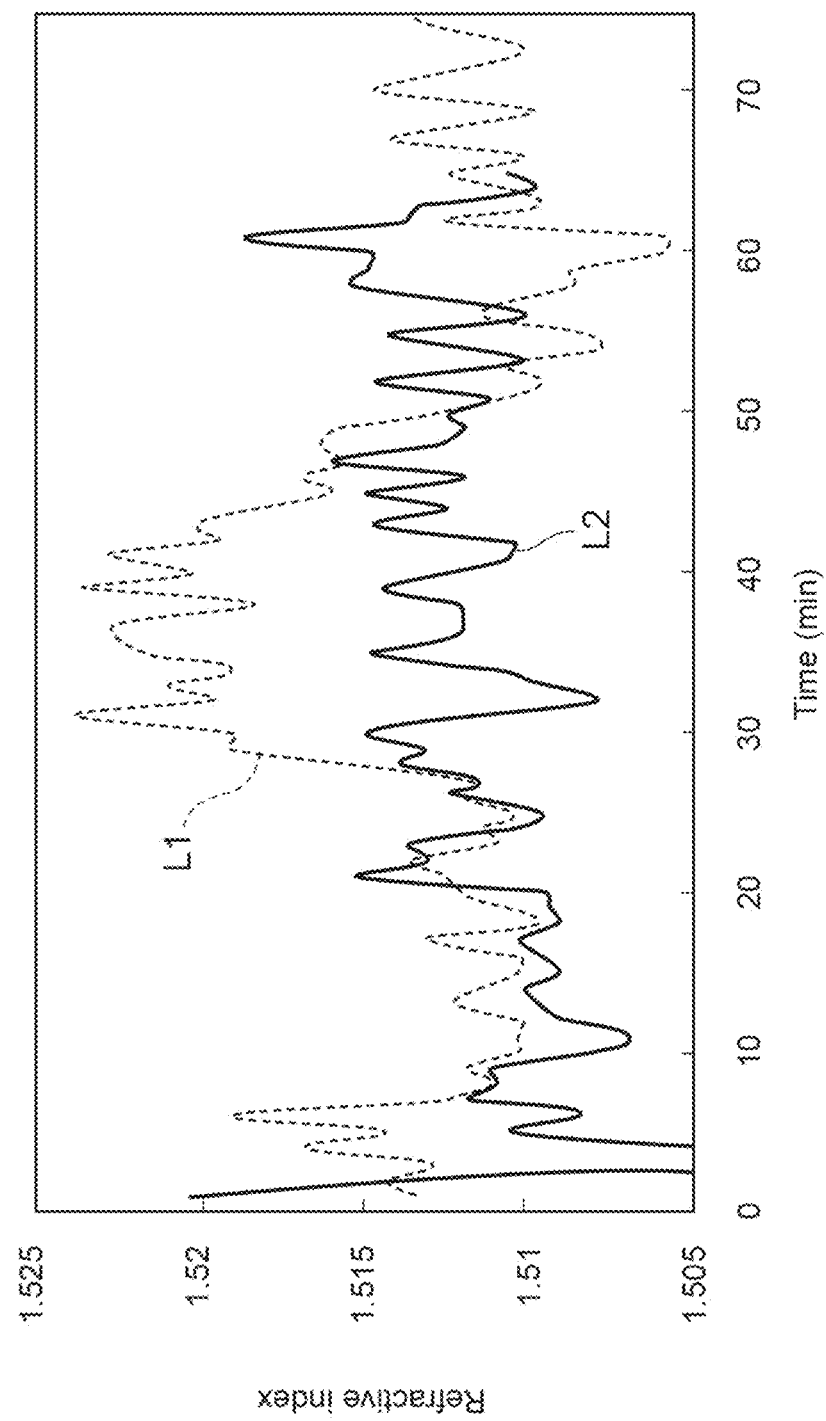
FIG. 12 is a view illustrating results of a comparative example and an example.

FIG. 12 is a view illustrating results of a comparative example and an example. In each of the comparative example and the example, change over time in refractive index of the sample S held by the holding unit 11 was measured. In each of the comparative example and the example, after approximately 25 minutes elapsed from starting of measurement, a heater started heating the sample S accommodated in the container 122, and after approximately 40 minutes elapsed from starting of measurement, the heater stopped heating the sample S accommodated in the container 122. The ATR apparatus of the comparative example differed from the ATR apparatus 1B of the example in not including the temperature adjustment unit 90. That is, in the comparative example, adjustment of the temperature of the sample S flowing through the introduction tube 123 was not performed.

As illustrated in FIG. 12, the refractive index L1 in the comparative example incremented after approximately 25 minutes elapsed from starting of measurement and decremented after approximately 40 minutes elapsed from starting of measurement. This result was considered to be caused by temperature change in the sample S held by the holding unit 11 because the sample S accommodated in the container 122 was heated. In contrast, no significant change over time was observed in the refractive index L2 in the example. This result was considered to be caused by the uniformly maintained temperature of the sample S held by the holding unit 11 even though the sample S accommodated in the container 122 was heated because the temperature of the sample S flowing through the introduction tube 123 was adjusted by the temperature adjustment unit 90.

Figure 13:
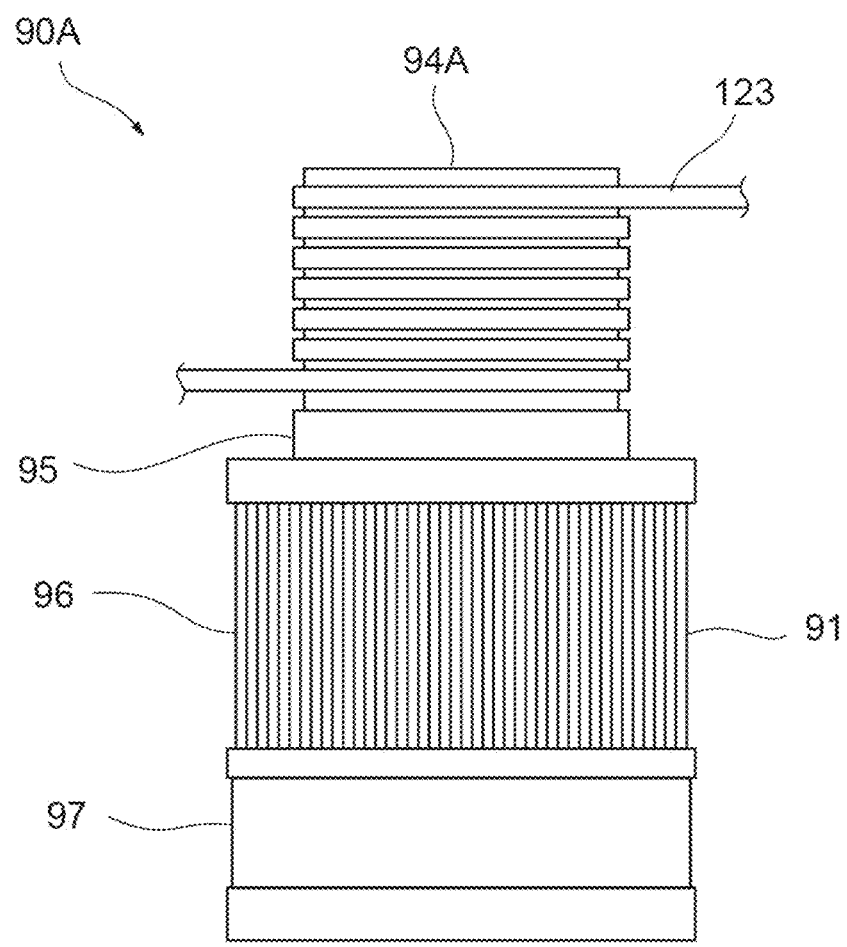
FIG. 13 is a view of a constitution of a temperature adjustment unit of a modification example.

As illustrated in FIG. 13, the heat treatment portion 91 of the ATR apparatus 1B may have a heat transfer portion 94A in place of the heat transfer portion 94. For example, the heat transfer portion 94A may exhibit a rod shape. The introduction tube 123 may be wound around the heat transfer portion 94A in a spiral shape.

The temperature adjustment unit 90 may have a plurality of heat treatment portions 91. The heat treatment portions 91 may be adjacent to each other outside the introduction tube 123. The temperature adjustment unit 90 may have one detection portion 92 corresponding to the plurality of heat treatment portions 91. The temperature adjustment unit 90 may have a plurality of detection portions 92 corresponding to each of the heat treatment portions 91. In the temperature adjustment unit 90, a plurality of heat treatment portions 91 and a plurality of or one detection portion 92 may be controlled by one controller 93.

The temperature sensor 98 may be provided at an arbitrary position in a flow channel of the sample S as long as the temperature of the sample S can be detected. For example, the tip portion of the temperature sensor 98 may be inserted into the introduction tube 123 between the heat transfer portion 94 and the pump 121. For example, the tip portion of the temperature sensor 98 may be inserted into the tube 123 between the pump 121 and the container 122 or between the container 122 and the holding unit 11. In these cases, it is possible to flexibly cope with detection of the temperature of the sample S as necessary, and it is possible to improve the degree of freedom in design of the ATR apparatus 1B.

The sample S may not include a suspension. The sample S may not include a suspended substance dispersed in a liquid. The sample S may include only a liquid.

REFERENCE SIGNS LIST 1, 1A, 1B ATR apparatus (attenuated total reflectance spectroscopy apparatus)
11, 18 Holding unit
12, 19 Adjustment unit
16 Holder
16c Recessed portion
16d Introduction hole
16e Outlet hole
20 Light output unit
30 Prism (optical element)
30c Reflection surface
70 Light detection unit
90 Temperature adjustment unit
91 Heat treatment portion
92 Detection portion
93 Controller (control unit)
95 Peltier element
121 Pump
124 Output control unit
123 Introduction tube
R Accommodation space
S Sample
T Terahertz waves (light)

The invention claimed is:

1. An attenuated total reflectance spectroscopy apparatus comprising:
    an optical element having a reflection surface;
    a holding receptacle configured to hold a sample including a suspension on the reflection surface; and
    an adjustment unit configured to adjust a fluidal state of the sample held on the reflection surface,
    wherein the adjustment unit is configured to
        adjust the fluidal state of the sample to a first fluidal state in order to acquire a first detection result relating to the sample in the first fluidal state, and
        adjust the fluidal state of the sample to a second fluidal state in order to acquire a second detection result relating to the sample in the second fluidal state, and
    wherein the first detection result in the first fluidal state and the second detection result in the second fluidal state are detection results of the same sample.

2. The attenuated total reflectance spectroscopy apparatus according to claim 1,
    wherein the holding receptacle includes a holder disposed on the reflection surface,
    the holder has a recessed portion defining an accommodation space for the sample together with the reflection surface, an introduction hole communicating with the recessed portion and allowing the sample to be introduced into the accommodation space to flow therethrough, and an outlet hole communicating with the recessed portion and allowing the sample to be lead out from the accommodation space to flow therethrough, and
    the adjustment unit includes a pump configured to cause the sample to circulate from the outlet hole to the introduction hole, and an output control unit configured to control an output of the pump.

3. The attenuated total reflectance spectroscopy apparatus according to claim 2,
    wherein the holder has transparency with respect to visible light.

4. The attenuated total reflectance spectroscopy apparatus according to claim 1 further comprising:
    a light output unit configured to output light to the reflection surface from a side opposite to the sample; and
    a light detection unit configured to detect the light reflected on the reflection surface,
    wherein the adjustment unit is configured to adjust the fluidal state of the sample during a period in which the light detection unit detects the light.

5. The attenuated total reflectance spectroscopy apparatus according to claim 4,
    wherein the light output from the light output unit is terahertz waves.

6. The attenuated total reflectance spectroscopy apparatus according to claim 1 further comprising:
    an introduction tube connected to the holding receptacle and configured to supply the sample to the holding receptacle; and
    a temperature adjuster provided to the introduction tube and configured to adjust a temperature of the sample flowing through the introduction tube.

7. The attenuated total reflectance spectroscopy apparatus according to claim 6,
    wherein the temperature adjuster includes
        a heat treatment portion provided outside the introduction tube and configured to perform heat treatment or cooling treatment with respect to the sample flowing through the introduction tube,
        a detection portion configured to detect a temperature of the sample flowing through the introduction tube, and
        a control unit configured to control an output of the heat treatment portion,
    wherein the control unit is configured to increase or decrease the output of the heat treatment portion on the basis of a detection result of the detection portion.

8. The attenuated total reflectance spectroscopy apparatus according to claim 7,
    wherein the heat treatment portion includes a Peltier element.

9. An attenuated total reflectance spectroscopy method comprising:

a first step of holding a sample including a suspension on a reflection surface;

a second step of adjusting a fluidal state of the sample such that the sample held on the reflection surface is in a first fluidal state;

a third step of acquiring a first detection result relating to the sample in the first fluidal state;

a fourth step of adjusting the fluidal state of the sample such that the sample held on the reflection surface is in a second fluidal state; and a fifth step of acquiring a second detection result relating to the sample in the second fluidal state, wherein the first detection result in the first fluidal state and the second detection result in the second fluidal state are detection results of the same sample.

10. The attenuated total reflectance spectroscopy method according to claim 9, wherein the first fluidal state is stronger than the second fluidal state.

11. The attenuated total reflectance spectroscopy method according to claim 10, wherein the second fluidal state is a stationary state.

12. The attenuated total reflectance spectroscopy method according to claim 9 further comprising:

a sixth step outputting light to the reflection surface from a side opposite to the sample and detecting the light reflected on the reflection surface, wherein the second step, the third step, the fourth step, and the fifth step are performed during a period in which the sixth step is performed.

13. The attenuated total reflectance spectroscopy method according to claim 12, wherein the light is terahertz waves.

14. The attenuated total reflectance spectroscopy method according to claim 9 further comprising:

a seventh step of acquiring information relating to the sample on the basis of the first detection result and the second detection result.

\* \* \* \* \*